(54) INTEGRATED MOTION VISION SENSOR

(75) Inventor: Miguel Arias-Estrada, Guanajuato (MX)

(73) Assignee: Universite Laval (CA)

( * ) Notice: Subject to any disclaimer, the term of this patent is extended or adjusted under 35 U.S.C. 154(b) by 0 days.

(21) Appl. No.: 09/112,101

(22) Filed: Jul. 9, 1998

Related U.S. Application Data

(60) Provisional application No. 60/052,136, filed on Jul. 10, 1997.

(51) Int. Cl.[7] .................................................... H04N 5/228
(52) U.S. Cl. .......................... 702/150; 702/152; 702/187; 382/209
(58) Field of Search .................................... 348/158, 165, 348/144; 358/213.24; 702/150, 151, 152, 153; 382/209; 707/100

(56) References Cited

U.S. PATENT DOCUMENTS

| | | |
|---|---|---|
| 4,785,349 | 11/1988 | Keith et al. . |
| 5,099,156 | 3/1992 | Delbrûck . |
| 5,153,719 | 10/1992 | Ibenthal . |
| 5,155,597 * | 10/1992 | Lareau et al. .................. 358/213.24 |
| 5,319,456 | 6/1994 | Nishida et al. . |
| 5,376,813 | 12/1994 | Delbrûck et al. . |
| 5,387,947 | 2/1995 | Shin . |
| 5,404,556 | 4/1995 | Mahowald et al. . |
| 5,428,403 | 6/1995 | Andrew et al. . |
| 5,430,487 | 7/1995 | Naimpally . |
| 5,461,423 | 10/1995 | Tsukagoshi . |
| 5,467,136 | 11/1995 | Odaka et al. . |
| 5,469,226 | 11/1995 | David et al. . |
| 5,477,272 | 12/1995 | Zhang et al. . |
| 5,535,302 | 7/1996 | Tsao . |
| 5,798,786 * | 8/1998 | Lareau et al. ........................ 348/144 |

OTHER PUBLICATIONS

Computational Sensors, Report from DARPA Workshop, T. Kanada and R. Bajcsy, Eds., University of Pennsylvania, May 11–12, 1992.

R. Sarpeshkar, W. Bair, C. Koch, "Vision Motion Computation in Analog VLSI Using Pulses", in Neural Information Processing Systems 5, S. Hanson, J. Cowan, C. Giles, (eds.), Morgan Kaufman: San Mateo, pp. 781–788, 1993.

R. Eitenne–Cummings, S. Fernando, N. Takahashi, V. Shtonov, J. Van der Spiegel, P. Mueller, "A New Temporal Domain Optical Flow Measurement Technique for Focal Plane VLSI Implementation", in Proc. Computer Architectures for Machine Perception, by the Institute of Electrical and Electronics Engineers, Inc. pp. 335–343 1993.

M. Arias–Estrada, M. Tremblay, D. Poussart, "A Focal Plane Architecture for Motion Computation", Journal of Real–Time Imaging, Special Issue on Special–Purpose Architectures for Real–Time Imaging, 1996, pp. 351–360 Academic Press Limited.

T. Delbrûck and C. Mead, "Phototransduction by Continous–Time, Adaptive, Logarithmic Photoreceptor Circuits", Tech. Rep., California Institute of Technology, Computation and Neural Systems Program, CNS Memorandum 30, Pasadena, CA 91125, 1996, pp. 1–24.

(List continued on next page.)

*Primary Examiner*—Kamini Shah
(74) *Attorney, Agent, or Firm*—Michael D. Bednarek; Shaw Pittman

(57) ABSTRACT

A custom CMOS imager with integrated motion computation is described. The architecture is centered around a compact mixed-mode pixel with digital asynchronous self-signaling capabilities. An address-event communication channel with an external time-stamp protocol is used to compute image features velocities. The motion sensor could be used in applications such as self-guided vehicles, mobile robotics and smart surveillance systems.

10 Claims, 25 Drawing Sheets

OTHER PUBLICATIONS

C.P.Chong, C.A.T. Salama, K.C. Smith "Image Motion Detection Using Analog VLSI", IEEE J. Solid–State Circuits, Special Brief Papers, vol. 27, No. 1, 1992, pp. 93–96.

J. Lazzaro J. Wawrzynek, M. Sivilotti, D. Gillespie, "Silicon Auditory Processors as Computer Peripherals", IEEE Transactions On Neural Networks, vol. 4, No. 3, pp. 523–527, May 1993.

T. Delbrûck, "Investigations of Analog VLSI Phototransduction and Visaual Motion Processing", Ph.D. Thesis, Dept. of Computation and Neural Systems, California Institute of Technology, Pasadena, Ca 91125, 1993.

* cited by examiner

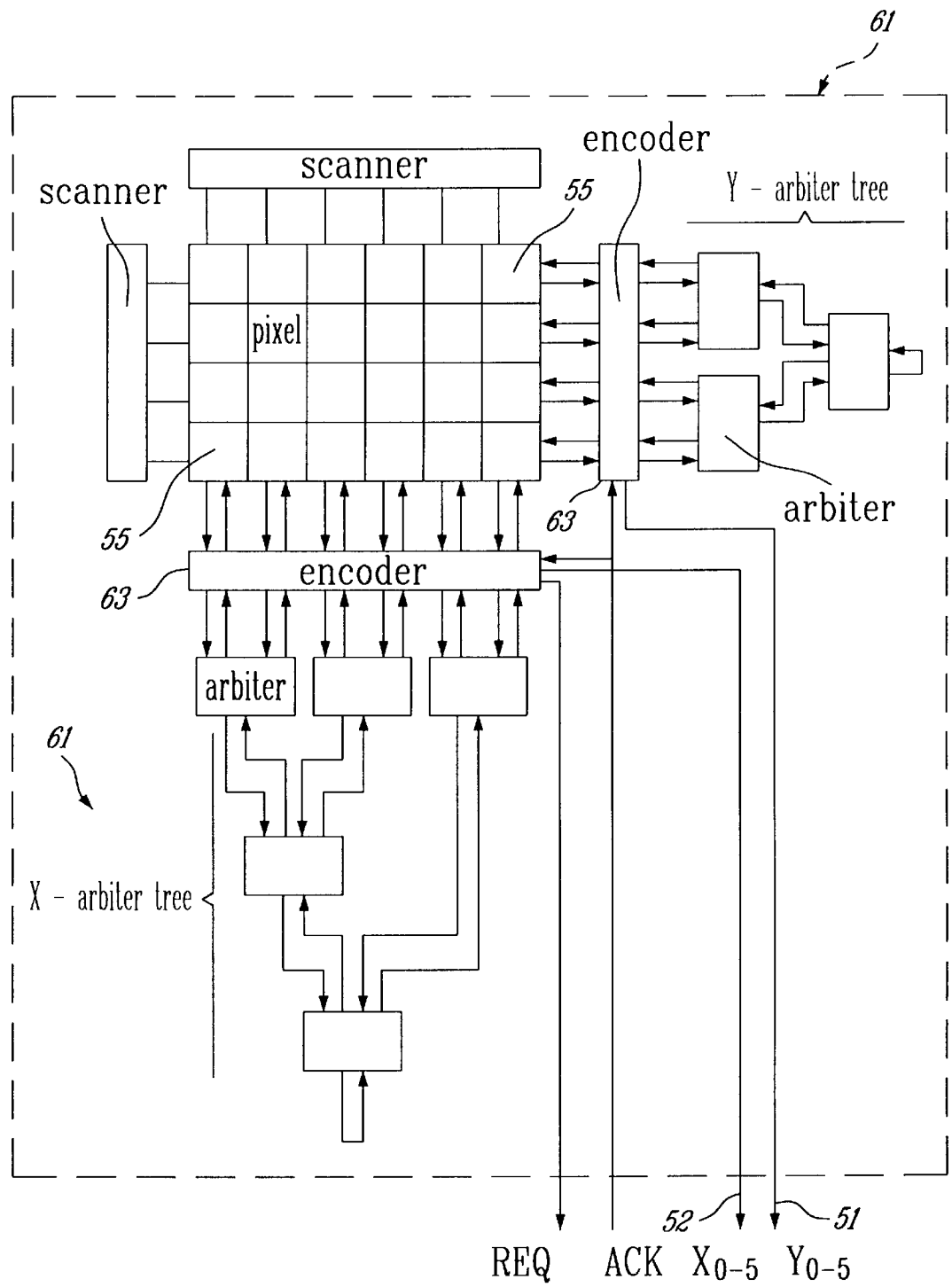

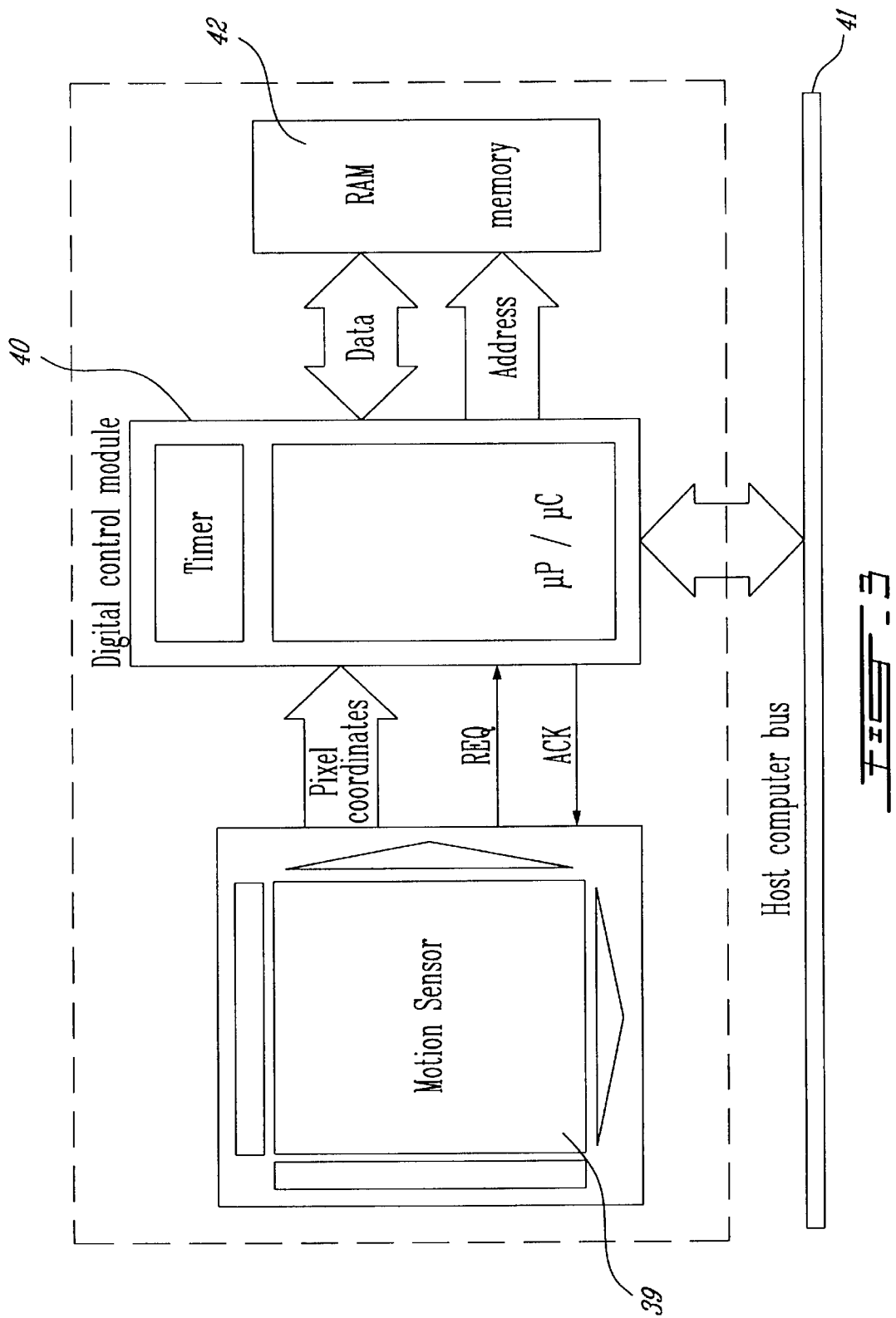

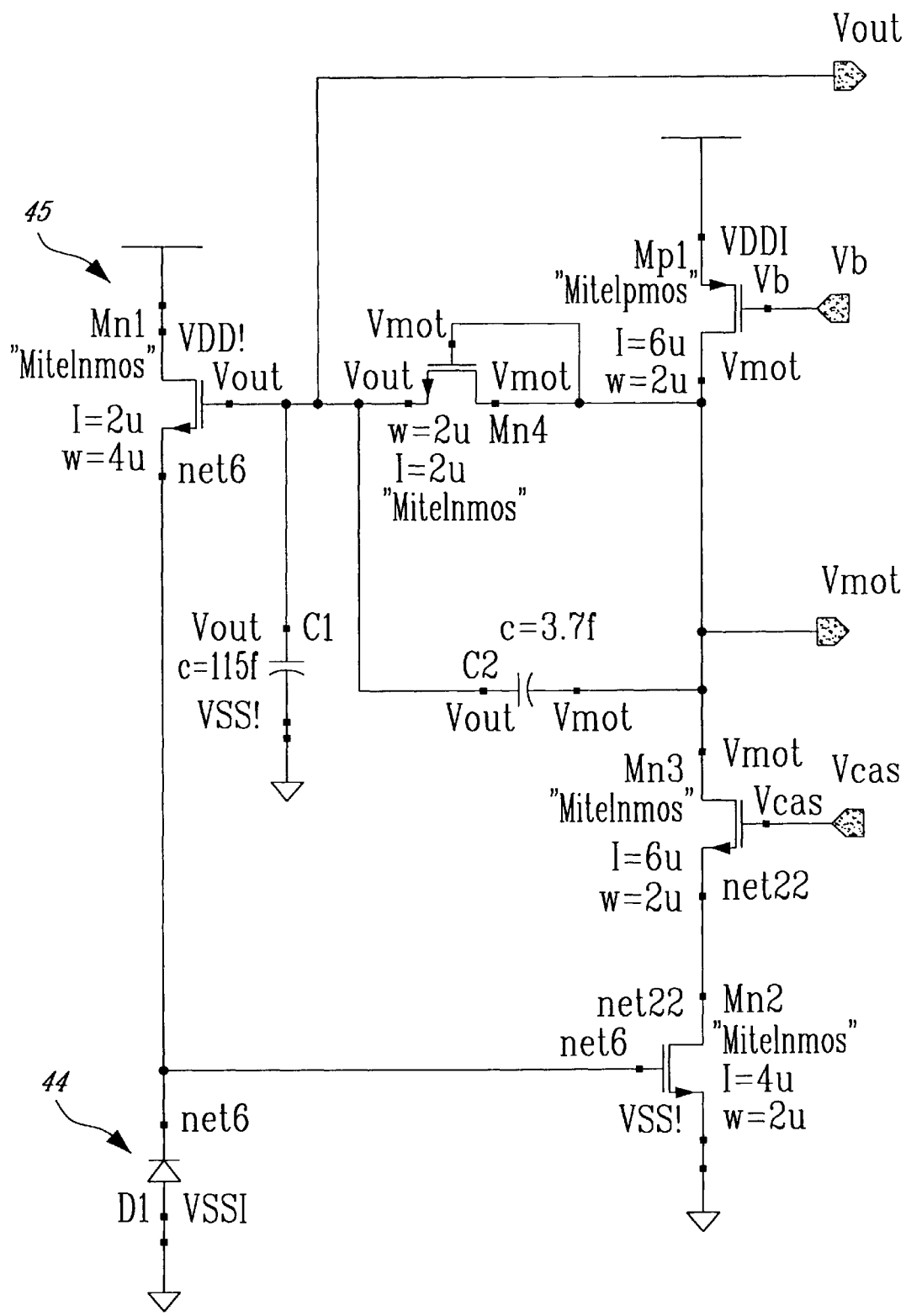

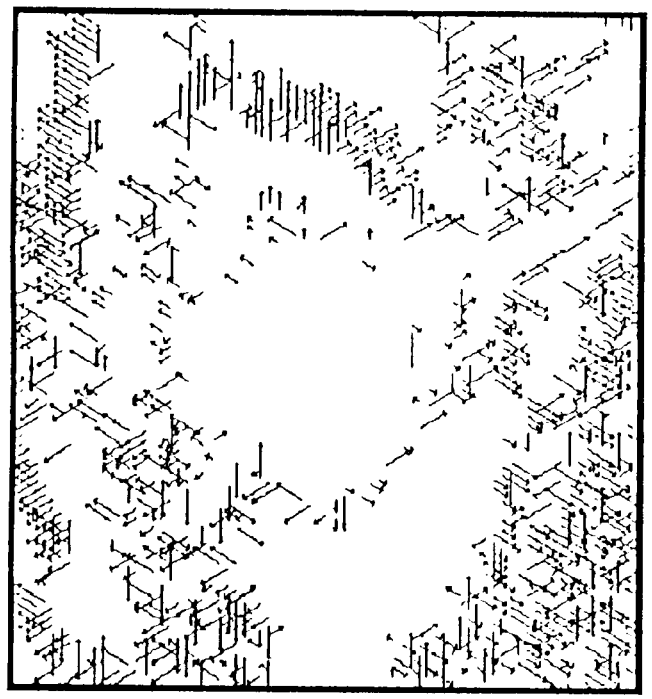
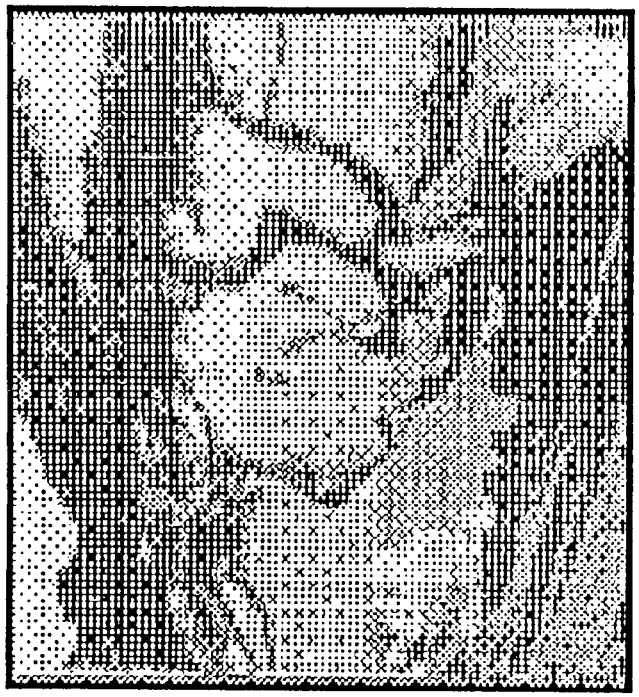
FIG. 23

INTEGRATED MOTION VISION SENSOR

This application claims the benefit of Provisional No. 60/052,136 filed Jul. 10, 1997.

FIELD OF THE INVENTION

The present invention relates to a motion vision sensor. The invention relates further to a motion vision sensor with self-signaling pixels.

1. Introduction

Image motion computation could benefit applications such as self guided vehicles, mobile robotics, smart vision systems and intelligent cameras. On the other hand, motion computation algorithms have large computational overheads, requiring specific architectures for real-time operation.

REFERENCES

The following references are of background interest to the present invention, and will be referred to hereinafter by the reference numeral in square brackets:

[1] *Computational Sensors, Report from DARPA Workshop,* T. Kanade and R. Bajcsy, Eds,. University of Pennsylvania, May 11–12, 1993.

[2] R. Sarpeshkar, W. Bair, C. Koch, "Vision Motion Computation in Analog VLSI using pulses," in *Neural Information Processing Systems* 5, S. Hanson, J. Cowan, C. Giles, (eds.), Morgan Kaufman: San Mateo, pp. 781–788, 1993.

[3] R. Etienne-Cummings, S. Fernando, N. Takahashi, V. Shtonov, J. Van der Spiegel, P. Mueller, "A New Temporal Domain Optical Flow Measurement Technique for Focal Plane VLSI Implementation," in *Proc. Computer Architectures for Machine Perception*, pp. 241–250, 1993.

[4] M. Arias-Estrada, M. Tremblay, D. Poussart, "A Focal Plane Architecture for Motion Computation", Journal of Real-Time Imaging, Special Issue on Special-Purpose Architectures for Real-Time Imaging, in press.

[5] T. Delbrück and C. Mead, "Phototransduction by Continuous-Time, Adaptive, Logarithmic Photoreceptor Circuits," Tech. Rep., California Institute of Technology, Computation and Neural Systems Program, CNS Memorandum 30, Pasadena, Calif. 91125, 1994.

[6] C. P. Chong, C. A. T. Salama, K. C. Smith. "Image motion detection using analog VLSI." IEEE J. Solid-State Circuits, Vol. 27, No. 1, pp 93–96.

[7] J. Lazzaro, J. Wawrzynek, M. Mahowald, M. Sivilotti, D. Gillespie, "Silicon auditory processors as computer peripherals," IEEE Transactions On Neural Networks, Vol. 4, No. 3, pp. 523–527, May 1993.

[8] T. Delbrück, "Investigations of Analog VLSI Phototransduction and Visual Motion Processing," Ph.D. Thesis, Dept. of Computation and Neural Systems, California Institute of Technology, Pasadena, Calif., 91125, 1993.

[9] T. Delbruck, C. Mead "Adaptive photoreceptor including adaptive element for long-time-constant continuous adaptation with low offset and insensitivity to light." U.S. Pat. No. 5,376,813

[10] T. Delbruck, C. Mead, "Subthreshold MOS circuits for correlating analog input voltages." U.S. Pat. No. 5,099,156

[11] M. Mahowald, M. Sivilotti, "Apparatus for carrying out asynchronous communication among integrated circuits." U.S. Pat. No. 5,404,556

Computational sensors [1] integrate sensing and processing on a VLSI chip providing a small, low-power and real-time computing front-end. Analog processing is often used because it interfaces nicely to the real world, it requires little silicon area and it consumes low power. Analog computation low precision is not essential for motion computation. In this document, we describe a motion computation imager which detects motion at the pixel level using analog processing techniques and communicates data through a digital channel. Velocity is computed in the digital domain during off-chip communication. The implemented architecture overcome some of the limitations and difficulties encountered on other focal plane architectures for motion computation [2, 3, 4] and overpasses largely traditional systems based on CCD imagers and a CPU.

This document is organized as follows: first, a description of the motion computation algorithm is given. Then an architecture overview is described from the pixel level to the communication protocol and the velocity computation process. The next section details the VLSI implementation, describing the pixel, the communication circuitry and the system organization. Finally, some preliminary results of the motion sensor architecture are presented.

SUMMARY OF THE INVENTION

It is a first object of the invention to provide a motion sensor which detects moving features and stores the time stamps for later computation of velocity. It is a second object of the invention to use an address-event protocol for the motion computation paradigm. It is a third object of the invention to compute the velocity by using the focal plane for detecting moving features, using an address-event protocol combined to a time-stamp protocol to facilitate further data manipulation, and a direct one-pass velocity algorithm. It is a fourth object of the invention to provide a relatively low complexity pixel, providing practical fabrication of high density arrays with standard CMOS technologies. It is a fifth object of the invention to provide a motion sensor in which velocity computation precision is programmable and dependent on an external digital timer instead of multiple analog RC constants in the focal plane, as is the case in previous approaches. It is a sixth object of the invention to provide a motion sensor in which analog VLSI computation techniques are combined with digital computation techniques. It is a seventh object of the invention to provide a motion sensor in which the architecture can be integrated with other focal plane functionalities for multifunctional vision sensors. It is an eighth object of the invention to provide a motion sensor having an SRAM cell with non-retriggerable input and asynchronous reset. It is a ninth object of the invention to provide a motion sensor in which a one pass algorithm is used to compute velocities based on the time-stamps. It is a tenth object of the invention to provide a motion sensor in which a simplified digital architecture is used to implement the one-pass algorithm which can be integrated in a sensor control module.

As will be appreciated, the invention can provide one or more of the following advantages:

Continuous velocity vector field extraction

High density array of pixels

High density array of motion vectors in real-time

Real-time operation

Minimize the use of transistors in analog VLSI susceptible to mismatch and process variation. Minimize the number of analog voltages to bias the aVLSI structures reducing routing complexity Compact three-chip solution to the motion computation paradigm: focal plane sensor, RAM memory, digital interface Potential low-cost fabrication Low power consumption, robust operation.

To in part achieve the above exact objectives, the invention provides a system for detecting and determining the direction of motion of an object, an image of which object appears as an image formed by an array of pixels. The system has a motion sensor with self-signaling pixels for signaling detection of motion and transmitting information regarding that motion. It also has a digital module which receives the information regarding the detected motion, which module stores this information and after a fixed measurement time period, computes velocity vectors from said information received from a set of at least two pixels and then transmits the velocity vectors to a host computer for further use. The motion sensor and digital module thus combined allow for real-time continuous operation of the system.

In a further aspect of this invention, the motion sensor has an array with a plurality of self-signaling pixels. The system then computes velocity vectors with a set of four adjacent pixels so that the digital module computes a bi-dimensional velocity vector. The system thus computes a plurality of velocity vectors which are sent as a vector map to the host computer.

The invention also provides a method for detecting motion of an object and determining the direction and speed of that motion, the method having the steps of sensing motion of an object with a plurality of self-signaling pixels, which pixels make up an array of motion sensors. Signaling by each of the pixels as it detects motion. Sequencing for attention during a time measurement period information being provided by each of the pixels which are sensing motion. Time-stamping the information received from each of the pixels. Saving the information from each of the pixels which has been time-stamped to a specific memory address. Retrieving from memory at the end of each time measurement period the information from each pixel which has been stamped during that measurement period. Computing velocity vectors from the time-stamped information. Creating with the computed velocity vectors a velocity vector map. Finally, using the velocity vector map to determine direction of motion and speed of an object.

In a further aspect of this method, the step of computing the velocity vector consists of the steps of reading from specific memory addresses time-stamped information of four adjacent pixels. Computing the direction of a velocity vector for the time-stamped information from the four pixels. Computing the speed of the velocity vector for the time-stamped information from the four pixels. Finally, saving the velocity vector to a velocity vector map.

In another aspect of this invention, it has a self-signaling pixel for use in a motion sensor array for detecting motion. The self-signaling pixel has a photoreceptor for detecting motion. It has an analog conditioning circuitry to convert a photoreceptor signal from an analog to a digital signal. It also has a digital memory cell to store signals generated by the photoreceptor. The pixel is operatively connected to the motion sensor array such that when the photodetector detects motion, the photodetector generates an analog signal with information concerning the motion. The signal is in turn converted to a digital signal which is saved to the memory cell. This memory cell retains the information until a signal sent by the pixel to the motion sensing array is acknowledged. At this point, the information in the cell is transferred from the memory cell to the sensing array for further processing and the memory cell is reset to receive and save the next signal generated by the photodetector.

BRIEF DESCRIPTION OF THE DRAWINGS

The present invention will be better understood by way of the following detailed description of a preferred embodiment thereof with reference to the appended drawings, the content of which can be summarized as follows:

FIG. 2. Functional block diagram of the Motion Sensor.

FIG. 3. Motion sensor system. The CMOS Motion Sensor is interfaced to a Digital control module which controls the sensor parameters and manages all the sensor requests. The digital module integrates a timer used to create the time stamps associated to the sensor requests and stored in a RAM memory. After a measurement period, the digital module computes the velocity vectors from RAM data using a one pass algorithm and transfer the vectors to the host computer. The digital module could be implemented as an off-the-shelf high performance microcontroller based board.

FIG. 6. 2:1 Cascadable Arbiter module.

FIG. 7. Time Adaptive photodetector.

FIG. 23. High level simulation using real images to validate the architecture. Divergent motion, camera approaching the tree.

DETAILED DESCRIPTION

2. Motion Computation Algorithm

The motion computation architecture is based on the motion detection pair [2, 4]. The particular implementation in the architecture is a modified version of the motion pair to compute the time of travel of a moving edge (temporal correlation) [3].

Figure 1B:
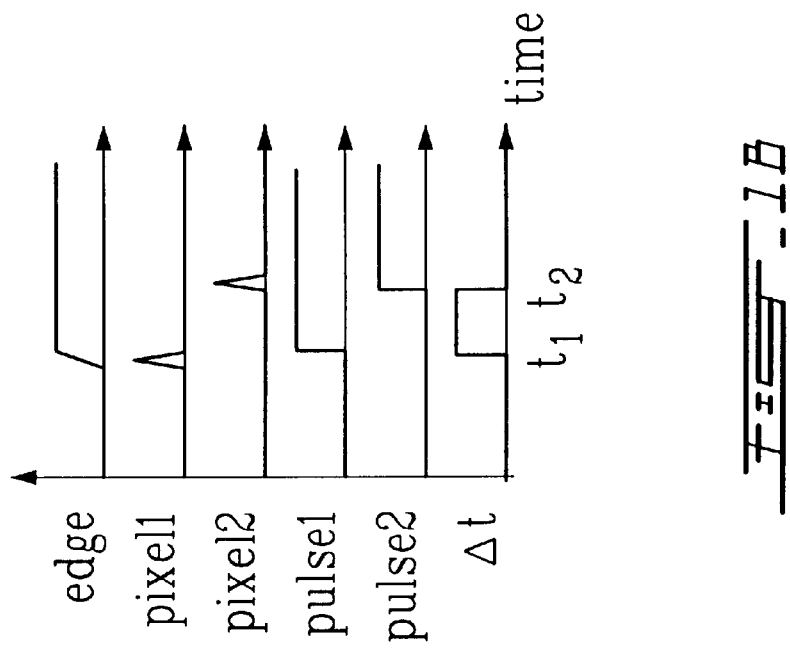
FIG. 1(a) Motion detection pair, FIG. 1(b) Time of travel algorithm.
Figure 1A:
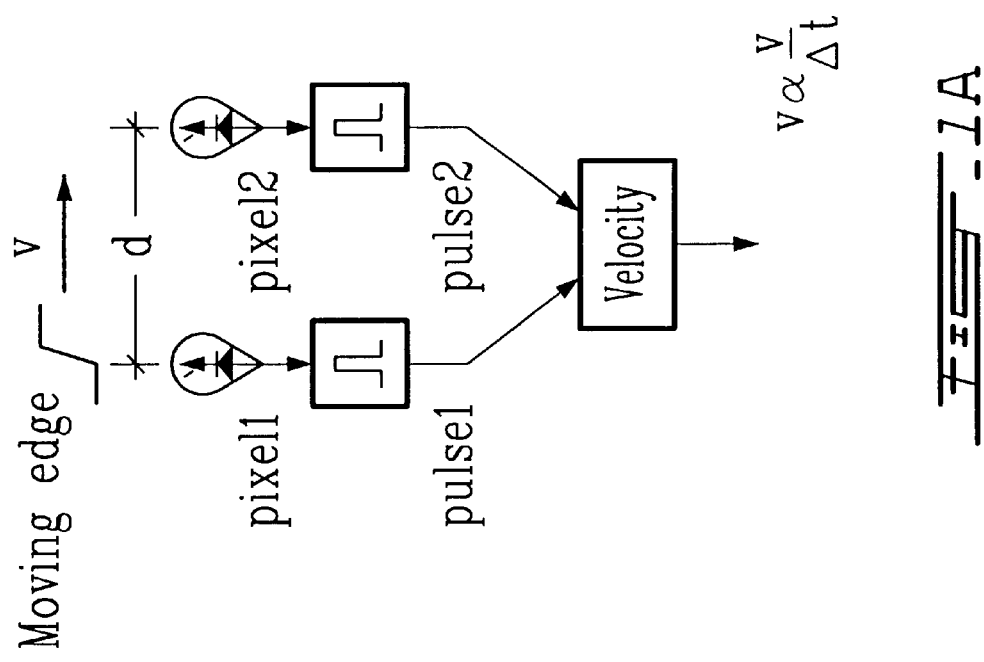

The motion pair (see FIG. 1a) is formed by two detection units separated by a fixed distance. The inputs are a couple of temporal adaptive pixels [5] which respond to temporal varying signals (i.e. moving edges) without relying on absolute intensity levels. The temporal adaptive pixel output is converted to digital levels and the velocity module measures the time difference between the on-sets of both branches.

The moving edge 59 triggers the pixels at different time points (see FIG. 1b) and depending on the edge velocity, the time difference will vary according to the edge direction and speed [3,4].

The velocity vector is computed based on the velocity equation:

$$v = \frac{d}{\Delta t}$$

where d is the inter-pixel distance, and $\Delta t$ is the time difference measured by the velocity module Edge velocity is assumed constant during the edge displacement between pixels. The condition applies for real images if $\Delta t$ is small.

Figure 4:
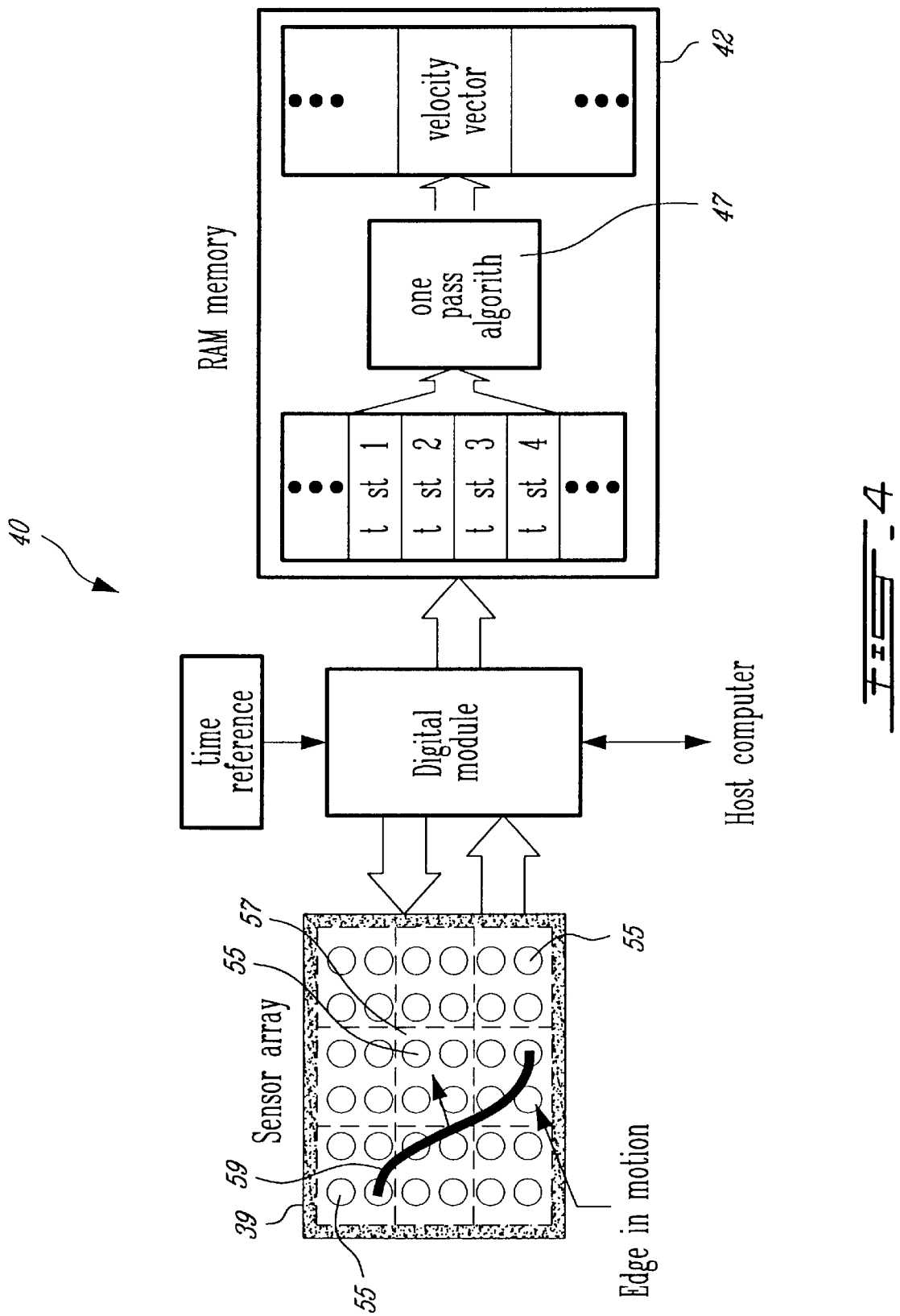
FIG. 4. Image Velocity Field computation System. The Address-event protocol is used to set time-stamps based on an external time reference. Velocity is computed from neighbor pixels and passed to a host computer as the image velocity field.
Figure 4A:
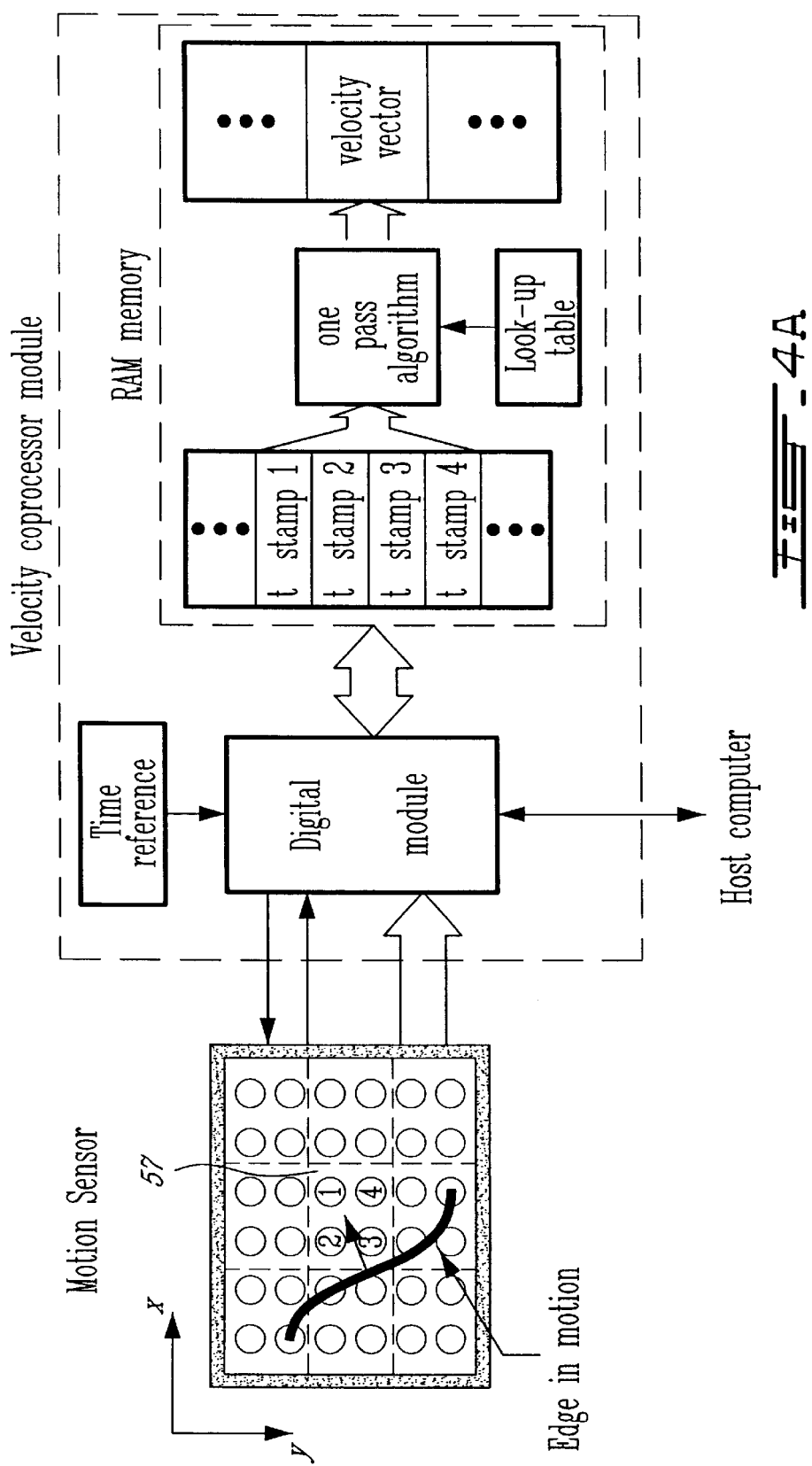
FIG. 4A is a slight variation of FIG. 4.
Figure 20:
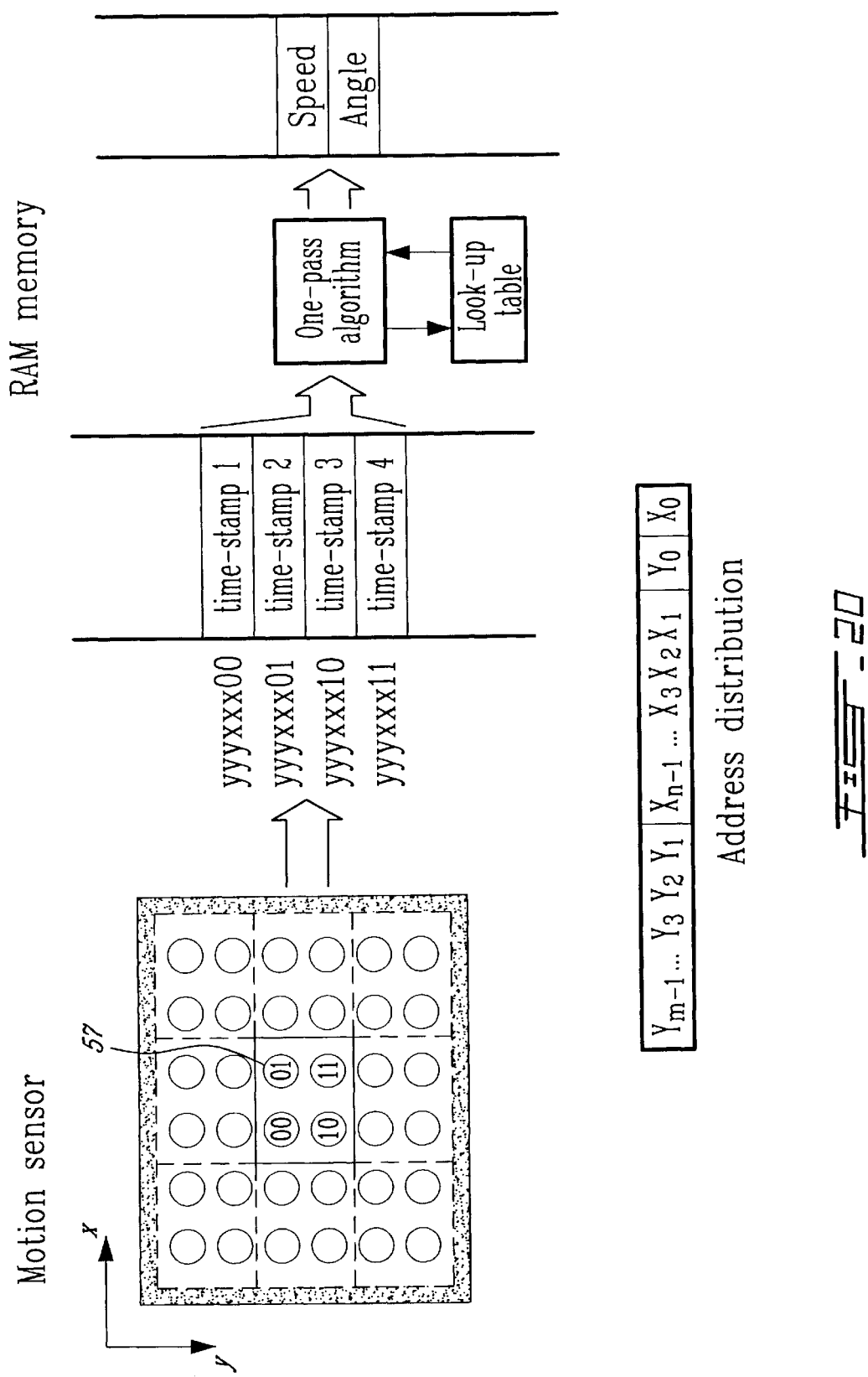
FIG. 20. RAM distribution in the system. Sets of four neighboring pixels are placed sequentially in RAM memory to simplify the velocity computation algorithm.

In a bidimensional array, pixels can be grouped in bidimensional sets of four pixels 57 to cover X and Y directions, as illustrated in FIGS. 4, 4A and 20. Time differences are computed in the X and Y motion pairs. Furthermore, it is possible to compute the time difference of the motion pairs formed by the diagonal pairs. Based on the directions covered by the pairs, it is possible to measure velocity in four directions. The measured time differences can be interpolated to increase the vector computation accuracy.

3. Architecture Overview

FIG. 2 is a block diagram of the motion imager. The architecture consists of an array of self-signaling pixels 55 with an address-event communication protocol [6,11] to send off-chip the pixel coordinates. The address-event system is implemented with two asynchronous 61 arbiter trees that decide on requests sequentiation, avoiding collisions during multiple motion-based pixel signalization. Two encoders 63 send out the signaling pixel coordinates during a transfer cycle.

The motion sensor 39 operates with a companion digital module 40 which interfaces it to a host processor (FIG. 3). The digital module 40 serves the motion sensor requests by assigning a time stamp to a RAM 42 location which corresponds to a pixel coordinate in the sensor. The digital sensor later converts these time stamps to a velocity vector (FIG. 4) and sends the vector map to a host computer. The sensor-digital module combination allows real time and continuous operation of the system.

The pixel 55 (see FIG. 5) is composed of a time-adaptive cell 51 [5] which uses analog signal processing to detect temporal illumination changes produced by moving edges in the image. The temporal adaptive cell 51 output is conditioned and compared to a threshold voltage and converted to a digital level. The signal on-set is used to set the pixel SRAM 45 which initiates row and column requests ($R_y$, $R_x$) indicating that motion has been detected. Once the request has been served by an external processor, the arbiter circuitry 61 resets the SRAM 45 using the row and column Acknowledge lines ($A_y$, $A_x$).

The arbitration trees 61 are built around a basic 2:1 arbiter circuit (6) (see FIG. 6). The arbiter is an SR flip-flop which decides on two input requests ($R_1$ and $R_2$) by asserting only one acknowledge line ($A_1$ or $A_2$). The arbiter module is cascadable: it waits for the acknowledge signal from arbiters at higher positions in the tree using R0 and A0 signals. In the pixel array, only one acknowledge line is set during the communication process. This line is used to encode the pixel coordinates which are sent out.

The motion sensor works as follows. First, a moving edge 59 (FIG. 4) triggers one or more pixels 55 in the array. The pixels requests are served first by the Y-arbitration tree (row) (see FIG. 2). Once a row is acknowledged, the X-arbitration tree (column) decides on a column and asserts the external REQ line. When the interruption is detected by the external processor, the x-y buses are enabled and communicate the pixel coordinates. Then the pixel is reset, releasing the REQ line, and leaving the system ready for a new communication cycle.

Velocity computation is carried on externally by a companion digital processor 40 that serves the sensor 39 requests (see FIG. 3). For each motion request, there is a time-stamp stored in a RAM 42 position corresponding to the pixel coordinates (FIG. 4). The time-stamp is used later to compute the time difference among neighbor pixels and obtain the velocity vector.

The possibility of pixel self-signaling allows asynchronous communication at high transfer rates. Moreover, the time constants of image feature motion are in the order of 10's of milliseconds, providing a wide time interval for multiple pixel data transfers, even for large arrays.

The digital processor 40 time reference can be selected to program the range and resolution of the velocity computation.

4. Pixel

Figure 5:
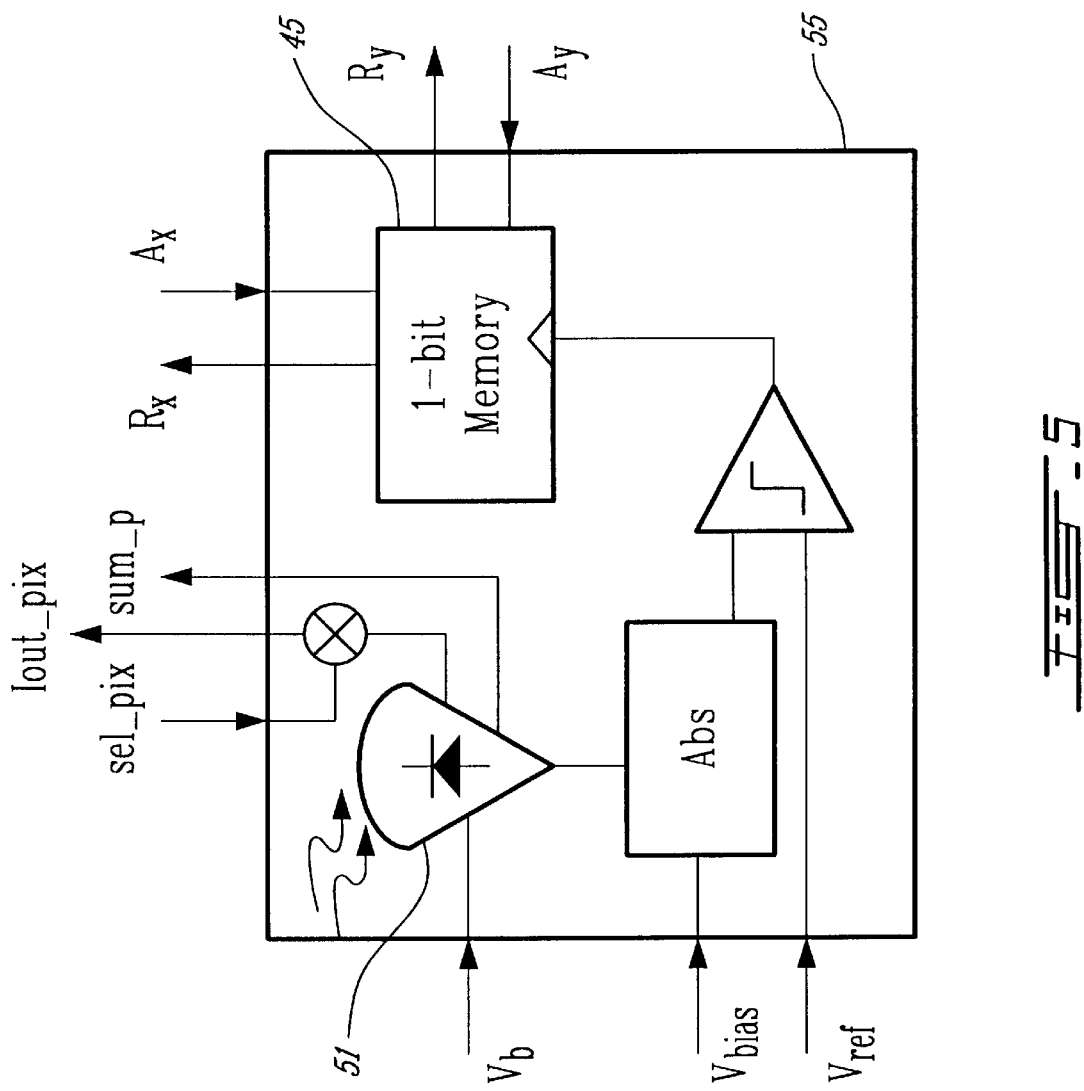
FIG. 5. Motion-based Self-Signaling Pixel.

The functional representation of a motion sensor pixel 55 is shown in FIG. 5. The purpose of the pixel 55 is to detect temporal variations in the illumination level and to signal them by initiating a communication cycle. The pixel can be read-out for instantaneous illumination level by enabling its output using the sel_pix line and reading a mirror of the pixel photocurrent in the Iout_pix line. There is circuitry to compute the illumination mean level of all pixels in the sensor through the line sum_p.

There are several ways to implement the pixel, the description below corresponds to the most compact way developed by the author.

4.1. Adaptive Photoreceptor

The role of the adaptive photoreceptor 51 is to compute temporal variations in the illumination level. There are two ways to implement an adaptive photoreceptor: a current based circuit developed by Chong et al. [6], and the voltage based circuit developed by Delbruck [5,9]. The later circuit was used in the present implementation because it is well characterized [5] and the voltage and current operating levels are less sensitive to noise compared to the Chua's implementation.

The circuit (see FIG. 7) consists of a a photodiode D1 biased with a NMOS transistor Mn1 connected to Vdd, and operating in subthreshold regime. The voltage output of the photodiode is connected to a simple analog inverting amplifier formed by Mp1 and Mn2 with a cascade transistor Mn3 which is always in conduction (Vcas=Vdd). The output of the amplifier is connected to a capacitor divider (C1 and C2) with a high resistive element, Mn4. The ratio of C1 and C2 is responsible of the adaptation constant of the photoreceptor. The voltage Vb bias the amplifier and it can be used to set the low-pass filter cut off frequency of the adaptive photoreceptor. The Vb voltage can be set to filter out 60 Hz noise from artificial illumination sources.

Figure 12:
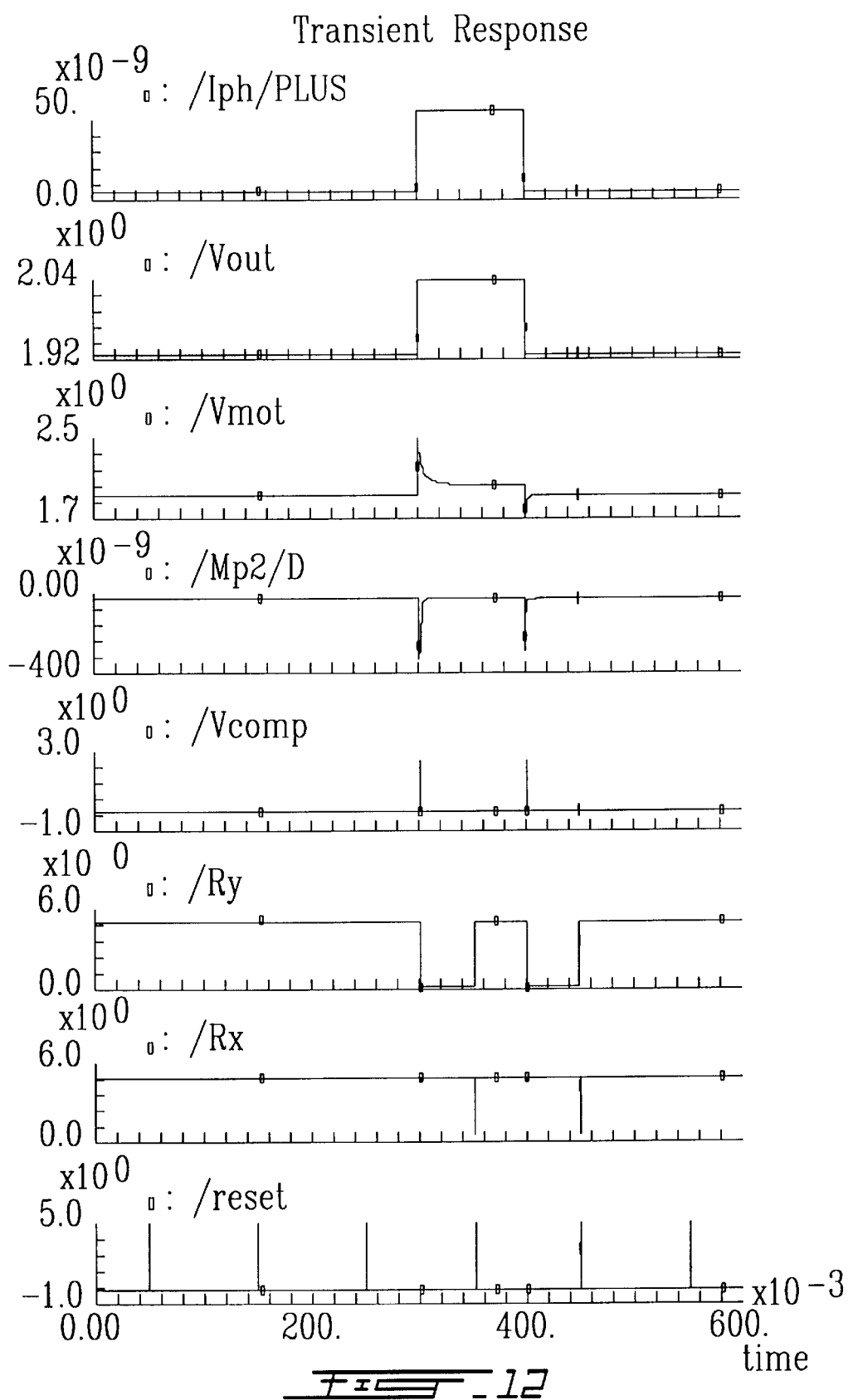
FIG. 12. Simulation of the Motion Pixel.

FIG. 12 shows the output of the adaptive pixel (Vout, Vmot) to a simulated edge (photodiode current /Iph/Plus). The edge produces a voltage transient step which is followed by the feedback voltage in the Mn1 gate. This signal corresponds to the instantaneous response of the photodiode and it is used in the read-out circuitry and the motion circuitry as Vout.

The original circuit is intended for slow adaptation to illumination level. A moving edge produces a voltage transient step that is higher than the adapted DC response by (C1+C2)/C2, the inverse of the capacitance divider gain in the feedback loop. Mn4 acts as an adaptive element which I-V relationship is that of a sinh function. Adaptation is slow for small output voltage steps (smooth illuminance transitions) and fast for large steps (edges in motion). The signal at the feedback loop which commands the gate of the bias transistor Mn1 (Vout) follows the illumination changes and it can be compared with the adapted output (Vmot) to generate a motion generated signal, independent of the illumination level. This signal is then converted to digital levels.

4.2. Analog Correlation

Figure 8:
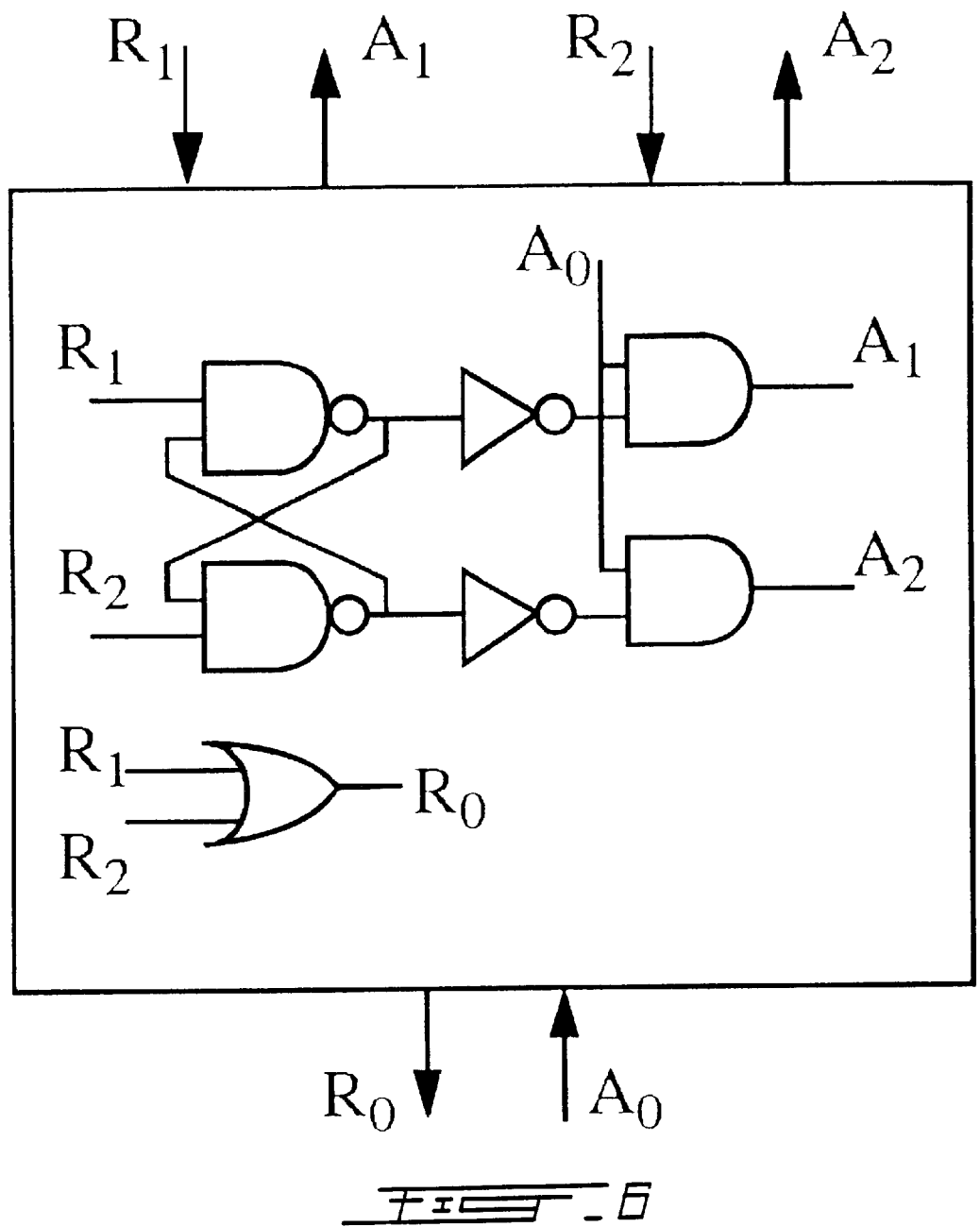
FIG. 8. Analog correlation Circuit and Current Comparator.
Figure 8:
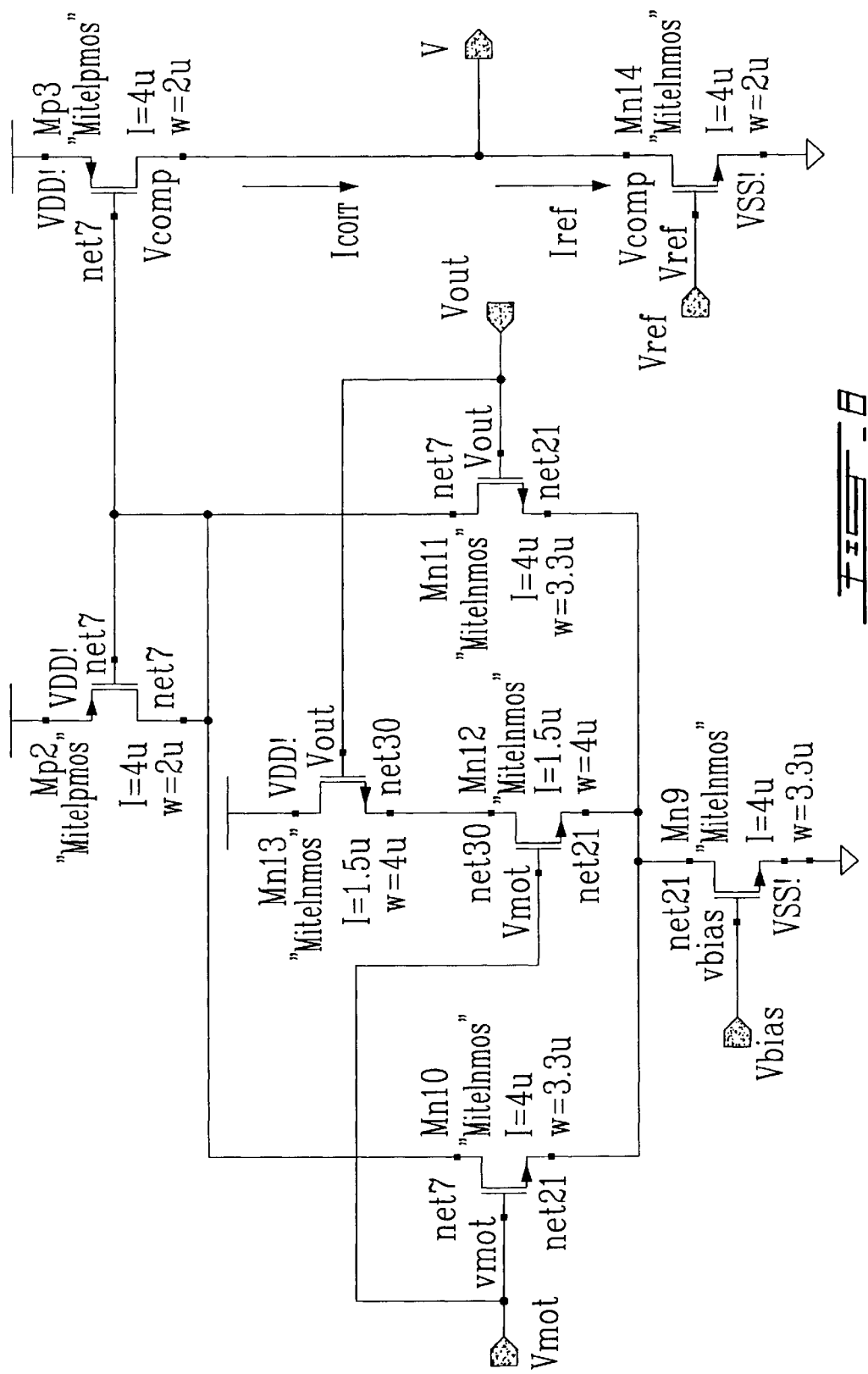

In order to compare the instantaneous response of the adaptive pixel, with the adapted signal, an analog correlation is performed to both signals. A Delbruck's analog correlation circuit [8,10] is implemented in the pixel. The correlation circuit shown in FIG. 8 is a modified differential pair (Mn9, Mn10, Mn11) with both drains connected together to a PMOS diode-connected transistor Mp2. An extra central branch of two nMOS transistors (Mn12 and Mn13), is connected to the inputs and serves as an analog correlation element. The differential transistors (MN10, Mn11) and the correlation branch (Mn12, Mn13) compete for the current set by the Vbias voltage in the Mn9 bias transistor. The circuit works in the subthreshold regime by setting the Vbias voltage lower than the threshold voltage of transistor Mn9. If the differential voltage |Vmot-Vout| is close to zero, the correlation branch equals the bias current. In the other side, if the differential voltage is large, the current circulates through one of the differential pair branches, and the correlation branch current diminishes. The current of the differential branches is copied out with the pMOS transistor Mp2 which acts as a pMOS current mirror that copy the current value to an analog comparator (Mp3 and Mn14).

FIG. 12 shows the current output of the analog correlation circuit (Mp2/D), as two current spikes that correspond to the simulated edges traveling over the pixel.

4.3. Analog Comparator

The output of the analog correlation circuit is compared to a reference value in order to control externally the sensitivity of edge motion detection. The added flexibility of this arrangement allow fine-tuning the sensor to different illumination and scene conditions.

The current output of the analog correlation circuit is copied to a PMOS transistor (Mp3), in a current mirror configuration. Mp3 is connected in series to a nMOS transistor Mn14 as shown in FIG. 8. Transistor Mn14 works as a current source controlled by the external Vref voltage. The Iref current generated in Mn14 competes with the Mp3 current in the Vcomp node. If the current set by the Vref is larger than the current set by the pMOS current mirror, the Vcomp node will be pulled down. In the other side, if the current from the analog correlator is larger than the reference current, the Vcomp node will be pulled to a high state. The Vcomp output is a digital signal which is used to interface the analog part of the pixel with the digital signaling circuitry described below.

The simulated output of the analog comparator circuitry (Vcomp) is shown in FIG. 12. It corresponds to a digital level indicating the detection of a moving edge. The levels are limited to 2.5 volts due to the non-retriggerable SRAM input, but the signal is capable of full 0–5 volts swing.

4.4. Non-Retriggerable SRAM

The output of the thresholding circuit is used to set (put a logic 1) in a static RAM cell. The cell state is then used to initiate a pixel-signaling cycle by a row and column request-acknowledge protocol. The output of the adaptive photoreceptor can take long time to settle (in the order of 10–100's milliseconds), and the output of the analog comparator could be signaling the |Vout–Vmot| absolute value difference for the same amount of time. To avoid false settings of the pixel's RAM cell, it should be sensitive only to the onset of the comparator output, and it should not be retriggered again until the comparator output returns to zero. To avoid the use of edge sensitive latches, which uses much silicon area, a non-retriggerable static RAM was developed.

Figure 9:
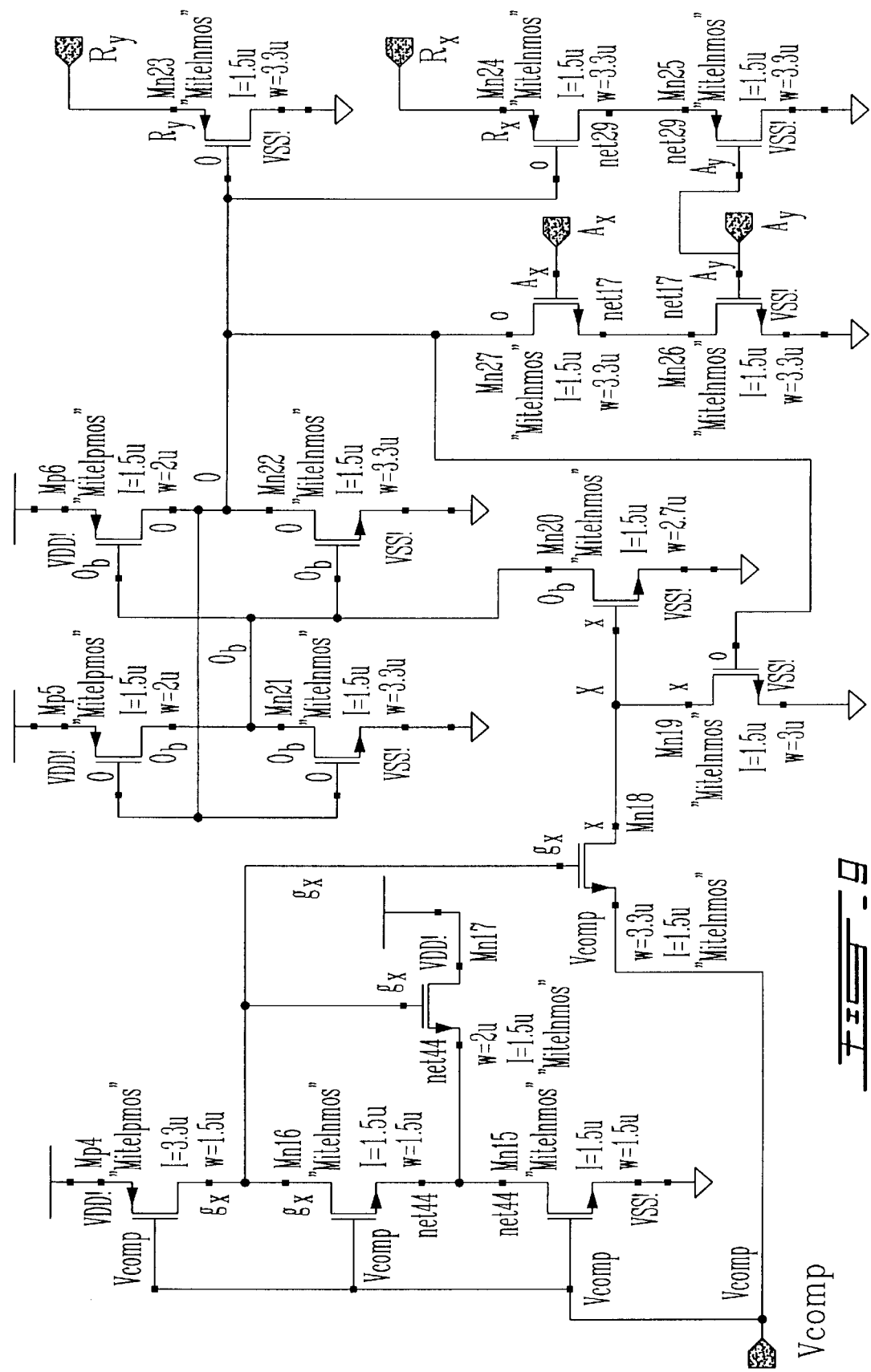
FIG. 9. Non-retriggerable Static RAM with request-acknowledge circuitry.

FIG. 9 shows the non-retriggerable SRAM implementation. The static RAM is implemented as a couple of cross connected inverters (Mn21, Mp5, Mn22, and Mp6). The inverters output Q is used to activate request lines implemented as pseudo-nMOS NOR gates along rows and columns in the pixel array. The row request signal is implemented with transistor Mn23, and the column request line with transistors Mn24 and Mn25. The acknowledge lines from the arbiter trees are used to reset the static RAM state by pulling down the output with the Mn26 and Mn27 transistors. The row acknowledge line is used to enable the column request Rx (Mn25) once the row has been served.

To set the static RAM to a logic one, the Mn20 transistor pulls down the Qb node of the RAM cell. In order to activate the Mn20 transistor, the X node at its gate has to be larger than 2.5 volts which is the designed switching threshold for the Mn20 transistor and the RAM cell. Node X is connected to the Vcomp signal from the analog comparator through a half transmission gate Mn18, activated by the inverted value of Vcomp. Mn19 transistor discharges the X node once the RAM cell is set to high and the half-transmission gate is open. The inverter controlling the half transmission gate (Mn18) is a simplified Schmitt-trigger, implemented with transistors Mn15, Mn16, Mn17 and Mp4. The Schmitt trigger inverter is designed with threshold voltages VH=3.5 volts and VL=1.7 volts.

The positive edge triggering mechanism works as follows. In an initial condition where Vcomp=0, an edge detection by the analog circuitry will produce a quick rise in Vcomp and a slow fall down, due to the slow adaptation in the photoreceptor. During Vcomp rise, the inverter will not switch until Vcomp equals VH=3.5 volts. Before switching, the output of the Schmitt-trigger inverter is High and transistor Mn18 is closed. When Vcomp equals Vth=2.5 volts, the RAM cell is set to one. At that time, the X node is forced to zero with Mn19 transistor and it will continue at zero until the pixel is served by the external circuitry. In the meantime, Vcomp continues to rise until it switches the Schmitt-Trigger inverter, opening the Mn18 half transmission gate. Mn18 will not be enabled until Vcomp fall under VL=1.7 volts. At this voltage, it cannot trigger the RAM cell because the X node will be under the threshold voltage Vth=2.5 volts.

Figure 10:
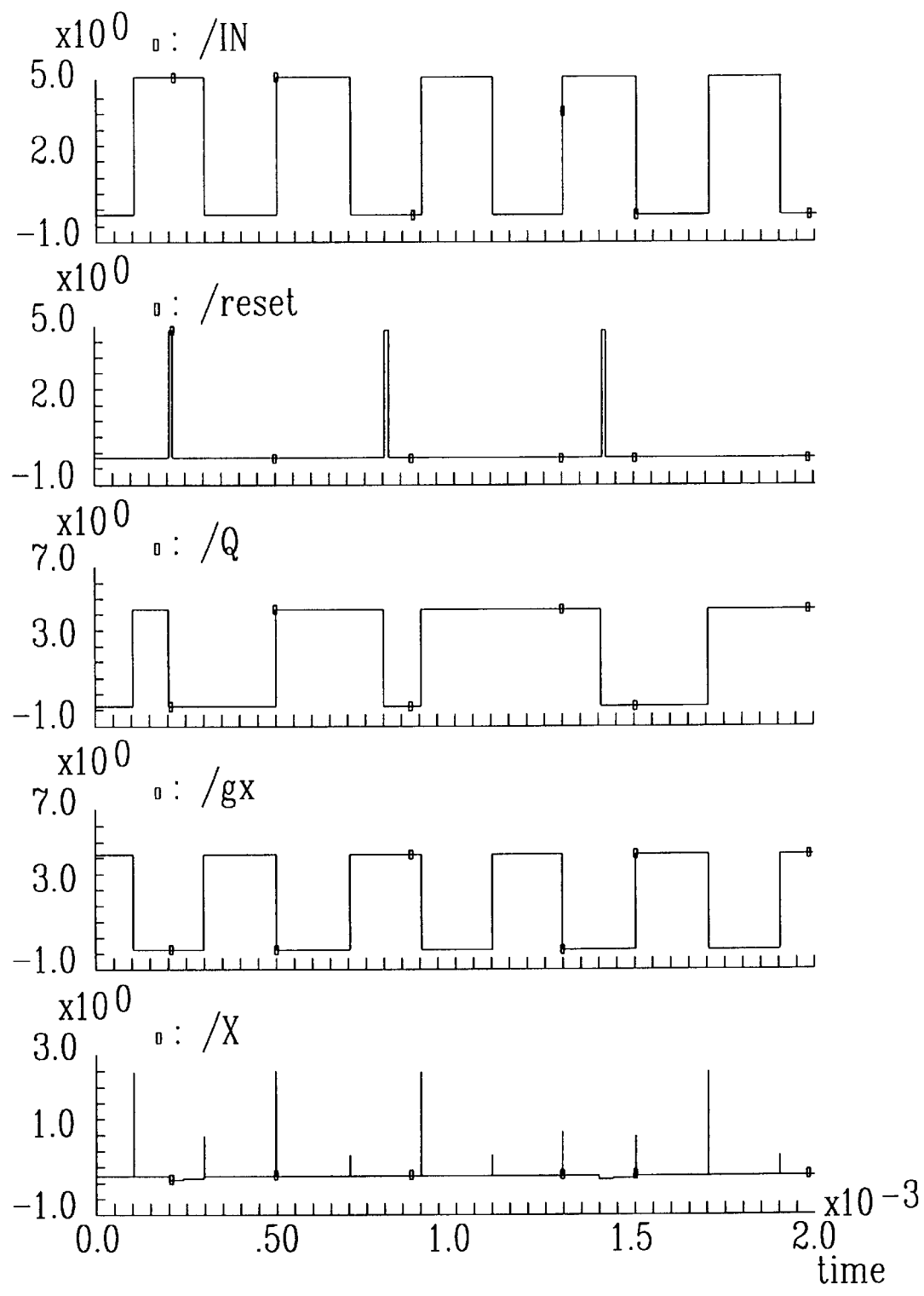
FIG. 10. Simulation of the Non-retriggerable Static RAM.

If the pixel has adapted and the thresholding output has returned to zero, the static RAM could be retriggered again. Simulated performance of the non-retriggerable circuit is shown in FIG. 10. The RAM cell is set whenever there is a positive edge at the Vcomp input, and it can be reset even if the input signal is high.

The full pixel simulation is shown in FIG. 12, the row and column acknowledge signals are simulated with a single reset signal, that is delayed several milliseconds to better show the Rx and Ry signals. Actual asynchronous operation will serve requests in some nano-seconds, the static propagation of asynchronous arbitration circuitry.

4.5. Mean Computation

Additional circuitry is included in the pixel that could be useful in practical applications. A collective mean computation circuit (see FIG. 11) is implemented with two transistors Mn5 and Mn6. Mn5 transistor mirrors the instantaneous response of the photodetector and it is converter to a voltage at the sum_p terminal by the diode-connected Mn6 transistor. The sum_p terminal is connected to the same terminal of all the pixels in the array. Each pixel will draw a current and reflect a proportional voltage, but only a global voltage in sum_p is kept which corresponds to the mean level of all pixels. Direct read-out of this signal can guide external circuitry to set an electrical iris to regulate the amount of light received by the sensor. The signal could be used for other on-chip signal processing in multifunctional vision sensors.

4.6. Illumination Read-Out

Figure 11:
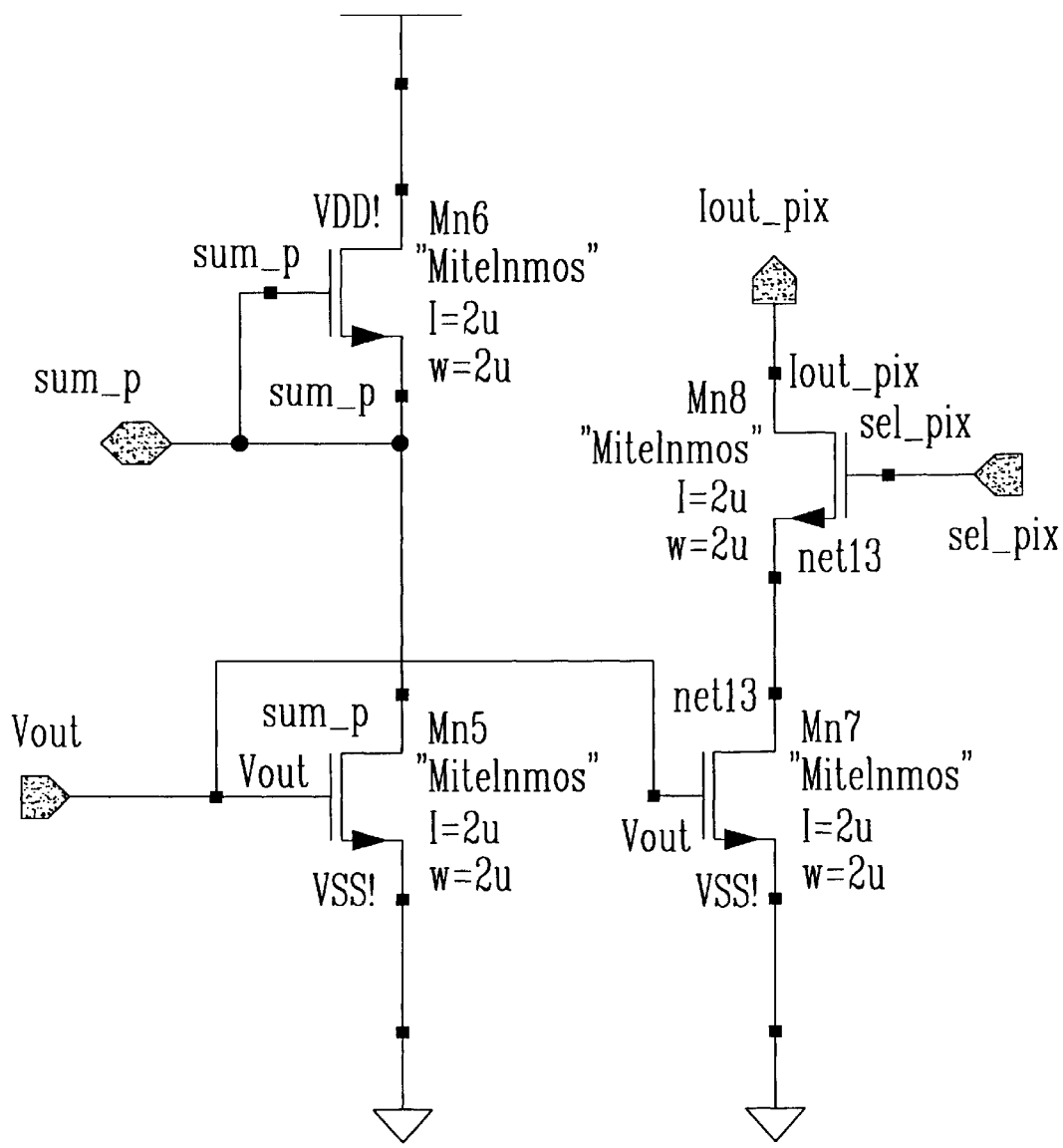
FIG. 11. Mean computation and Current Output circuitry.

Instantaneous illumination output is also included in the pixel (see FIG. 11). A current copy of the instantaneous response output of the photodetector is mirrored to a couple of transistors in series Mn7 and Mn8. Mn8 transistor is used to enable the current output Iout_pix to a row or column bus. The pixel array outputs can be read-out using X and Y bidirectional shift-registers to select individual pixels and route-out the pixel current value. Scanning schemes, like continuous or addressable can be used to read-out intensity images from the pixel array, or use the analog signal for further analog signal processing.

5. Arbitration Circuitry

The Arbiter Tree circuitry serves requests from the pixel array by selecting only one pixel and sending off-chip the pixel coordinates. The circuitry is completely asynchronous providing high speed response to pixel requests. With current microelectronics technologies, high density arrays (higher than 256×256 pixels) can be served in real time without speed and bottleneck limitations.

The arbitration circuitry is based on a simple 2:1 arbitration module that can be connected in a tree with other similar cells. Additional digital circuitry is included in the arbiters connected directly to the pixel array for buffering and pixel position encoding purposes.

5.1. Basic Arbitration Module

Figure 13:
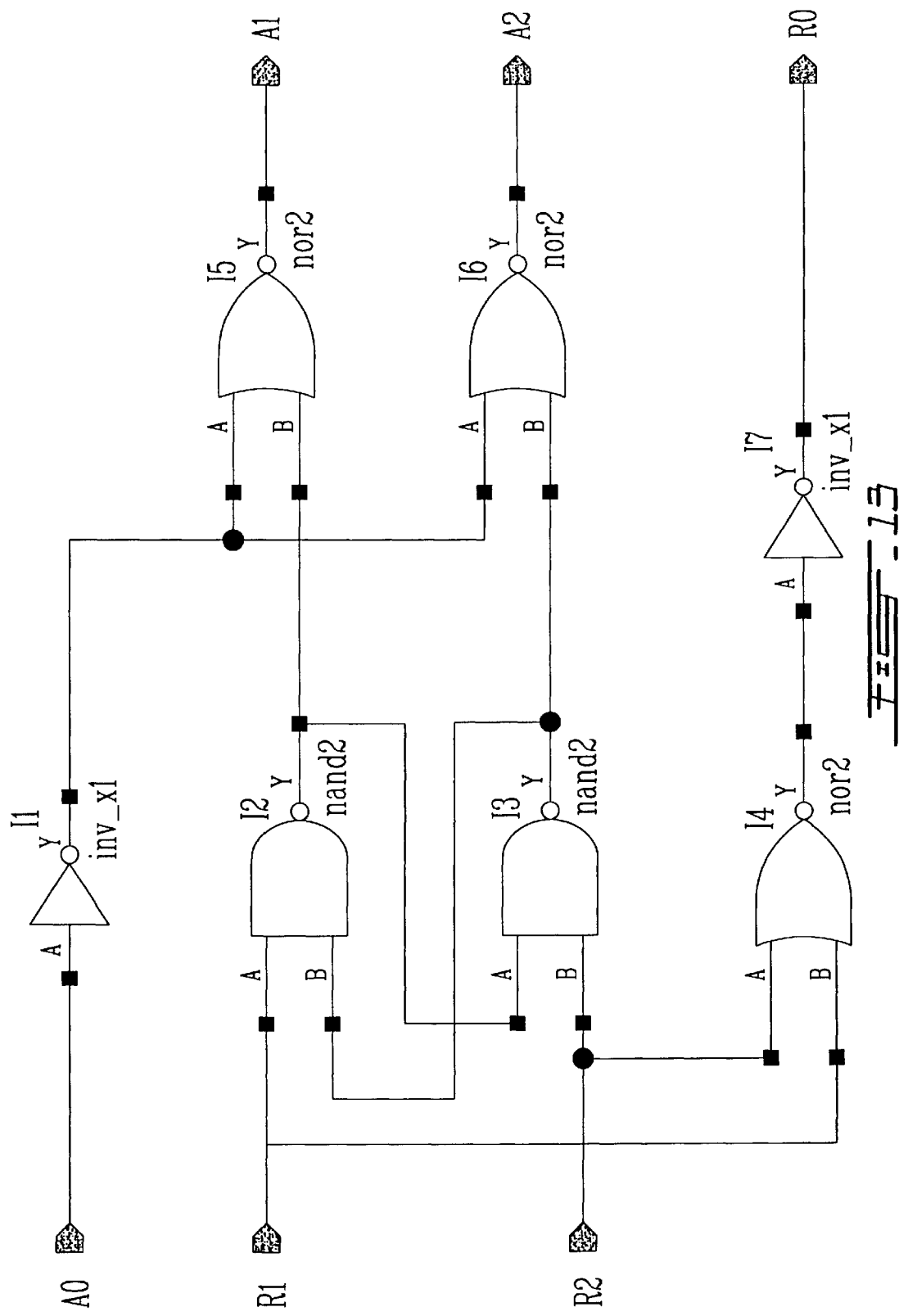
FIG. 13. Cascadable 2:1 Arbitration module.

The basic 2:1 arbitration circuit is shown in FIG. 13. The arbitration module asserts only one acknowledge line ($A_1$ or $A_2$) if there is a request input at $R_1$ and/or $R_2$ and the $A_0$ input is high. If both request lines are active at the same time, only one acknowledge line is activated.

The circuit is formed by an SR-latch composed of NAND gates $I_2$ and $I_3$. An $R_0$ output propagates to deeper levels of the tree the state of the arbitration module. $R_0$ is computed as the OR function between $R_1$ and $R_2$. If the arbitration modules deeper in the tree grant permission to the module, a high state is set in the $A_0$ input and the output of the SR-latch is gated to the $A_1$ and $A_2$ outputs through NOR gates $I_5$ and $I_6$. All I/O signals are positive active, the arbitration module at the bottom of the arbitration tree only needs to connect the $R_0$ output to its $A_0$ input.

5.2. Arbitration Tree

Figure 14:
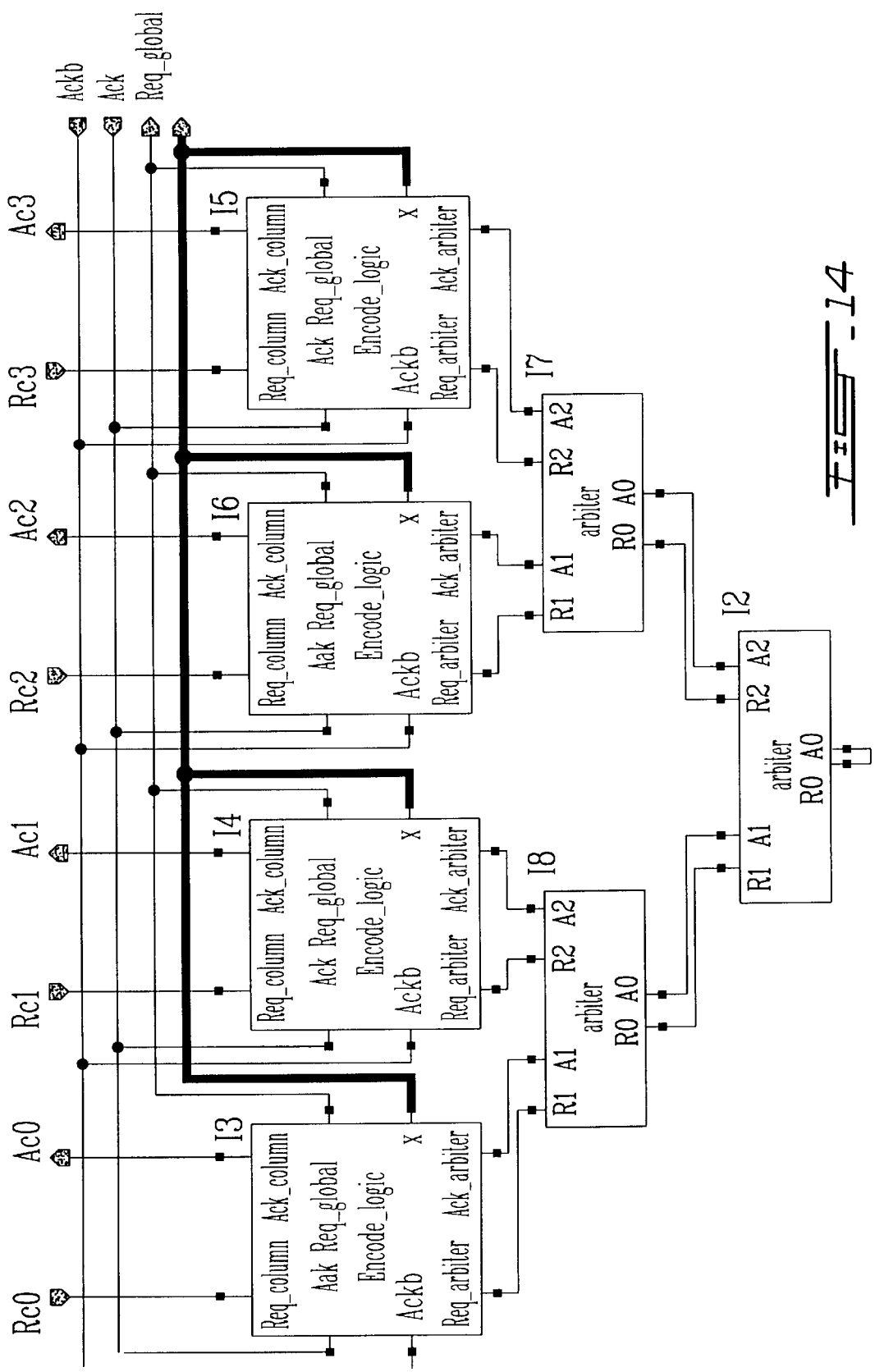
FIG. 14. Arbitration tree for 4 Request-Acknowledge lines. Implementation based on the basic 2:1 arbitration module.

The basic 2:1 arbitration circuit can be cascaded as shown in FIG. 14, to serve several requests. If there are more than one line requesting communication at the same time, arbiter modules in deeper levels of the tree will grant acknowledge to only one request at a time. The number of arbitration trees needed for N requesting lines is (N−1). The arbitration modules connected to the pixel array are interfaced with an Encode logic module.

5.3. Encode Logic Module

Figure 15:
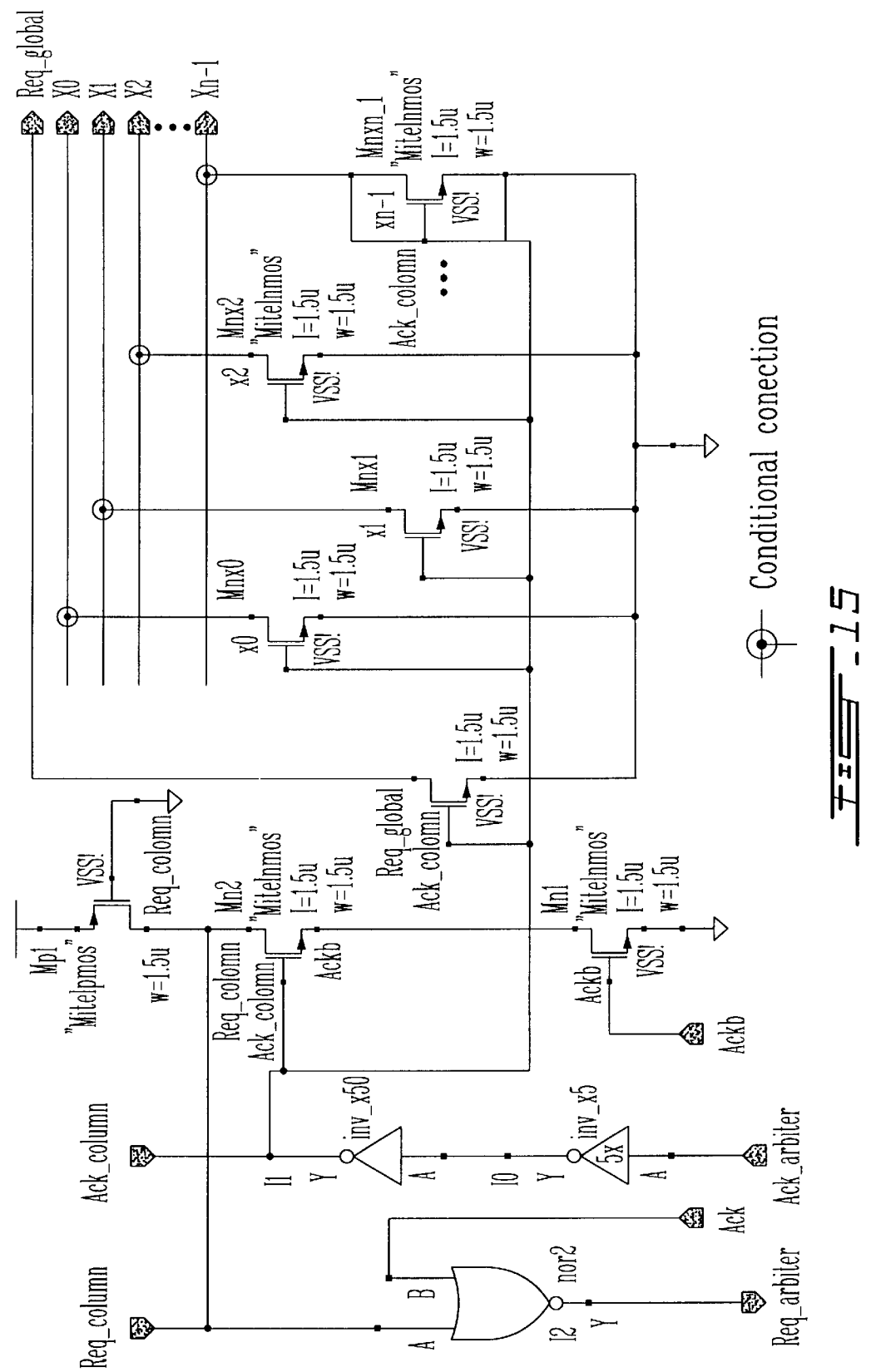
FIG. 15. Encode logic module to connect the arbiter modules to the pixel array, including the encoding circuitry to send out the position of the encoding module.

An Encode logic module is used to interface the arbitration tree with the request and acknowledge lines from the pixel array. The Encode logic module is shown in FIG. 15. The module includes buffering circuitry for the acknowledge lines formed by inverters I0 and I1. Gate I2 is used in combination with transistors Mn1, M2 and Mp1 to interface the incoming request line from the pixel array. Mp1 transistor is a pseudo-nMOS pull-up device to force the request line to high. The line is pulled down by a requesting pixel. If the external (off-chip) Acknowledge line (buffered in signals Ack and Ackb) is Low, the Req_arbiter signal is activated and the arbitration tree initiates a serving cycle. Once the arbitration tree responds with a high state at the Ack_arbiter line, the pixel is reset through the buffered Ack_column line. This signal will pull down the requesting line using the Mn2 transistor while the off-chip Acknowledge (ACK_ext) line is High, allowing the external circuitry to read-out the pixel coordinates encoded in the module. The column or row position of the Encode logic module is encoded by transistors Mnx0–Mnxn_1 that pull down pseudo-nMOS lines which are selectively connected according to the binary position of the module. For the column arbiter tree, a global request line (Req_global) is pulled-down to signal off-chip that a request is been served by the arbitration tree, and that the external circuitry needs to attend it.

5.4. Input/Output Logic Module

Figure 16:
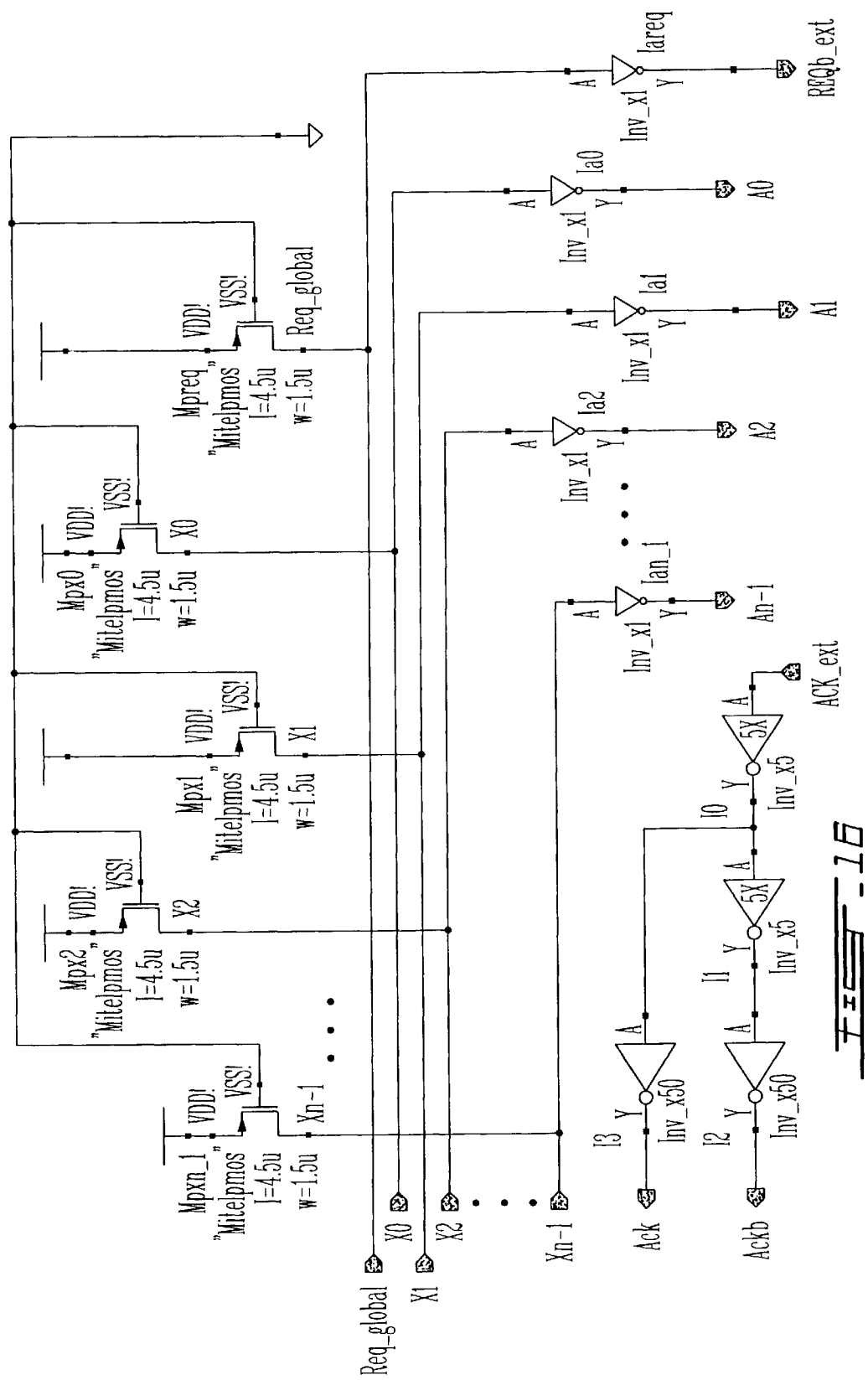
FIG. 16. I/O logic module that generates the internal signals for the interface and encoding modules, and send off-chip the coordinates of the encoding module.

The Encode logic is connected to a single I/O-logic module (see FIG. 16) that contains the pseudo-nMOS pull-up transistors. Then, the encoding lines are inverted (Ia0–Ian_1), and they are sent off-chip. A similar array is repeated for the Y[0:n−1] lines. The module also includes buffering circuitry (I0–I3) for the external acknowledge line (ACK_ext) which is sent to all the arbiter logic modules as the buffered signals Ack and Ackb. Finally, a pull-up pMOS transistor with inverter Iareq sends off-chip the column request line to initiate an off-chip communication cycle.

5.5. X and Y Arbitration Trees for Bidimensional Arrays

Figure 17:
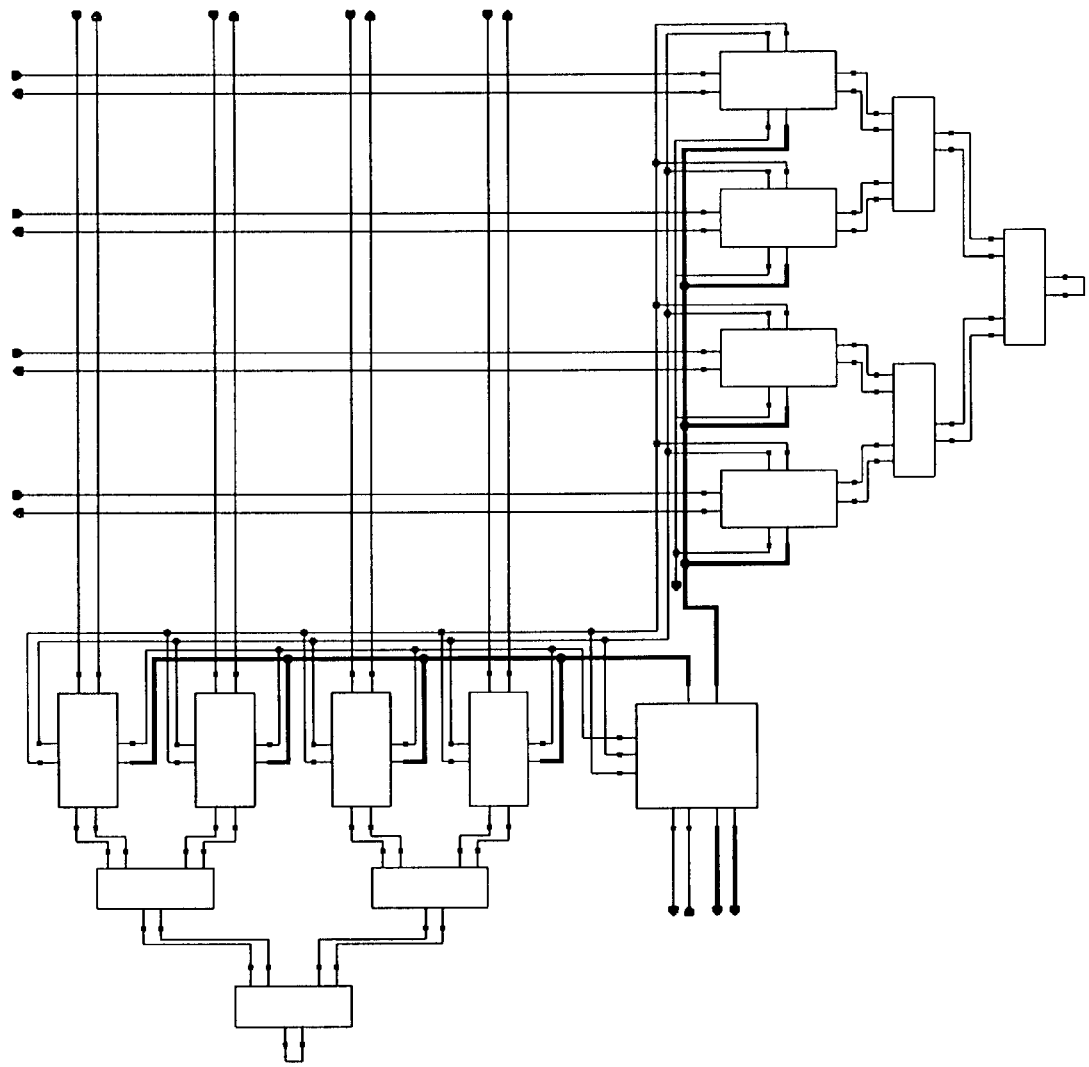
FIG. 17. Bidimensional distribution of arbiter trees and encoding logic for X and Y. Example for a 4×4 pixels array.
Figure 18:
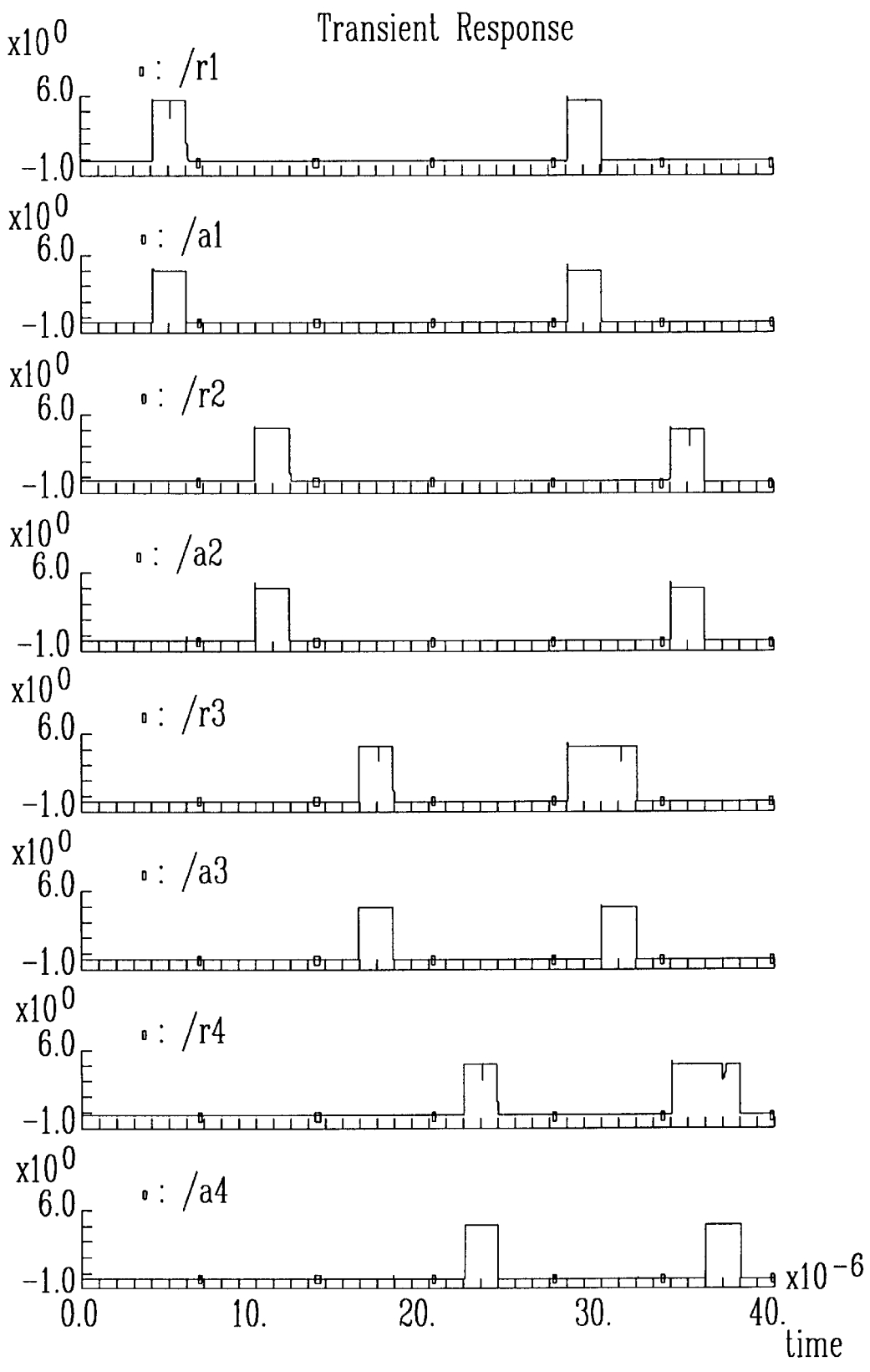
FIG. 18. Simulation of a 4-lines arbitration tree. The first four request are sequential, then there are simultaneous requesting from R1–R3 and R2–R4. Only one Acknowledge line is active at a time.

FIG. 17 shows the I/O module connections in a 4×4 pixels array. Two arbitration trees serve the pixel requests. First a pixel sends a request along the row line where the Y-arbitration tree acknowledges the row. Then, the pixel initiates a column request. The X-arbiter acknowledges the column, and initiates an external request through the REQb_ext line (active-low signal). If the external digital device is ready to serve the sensor's request, it sets High the ACK_ext line and read-out the coordinates of the requesting pixel. At this moment, the REQb_ext line will return to High until a new request is initiated.

Figure 19:
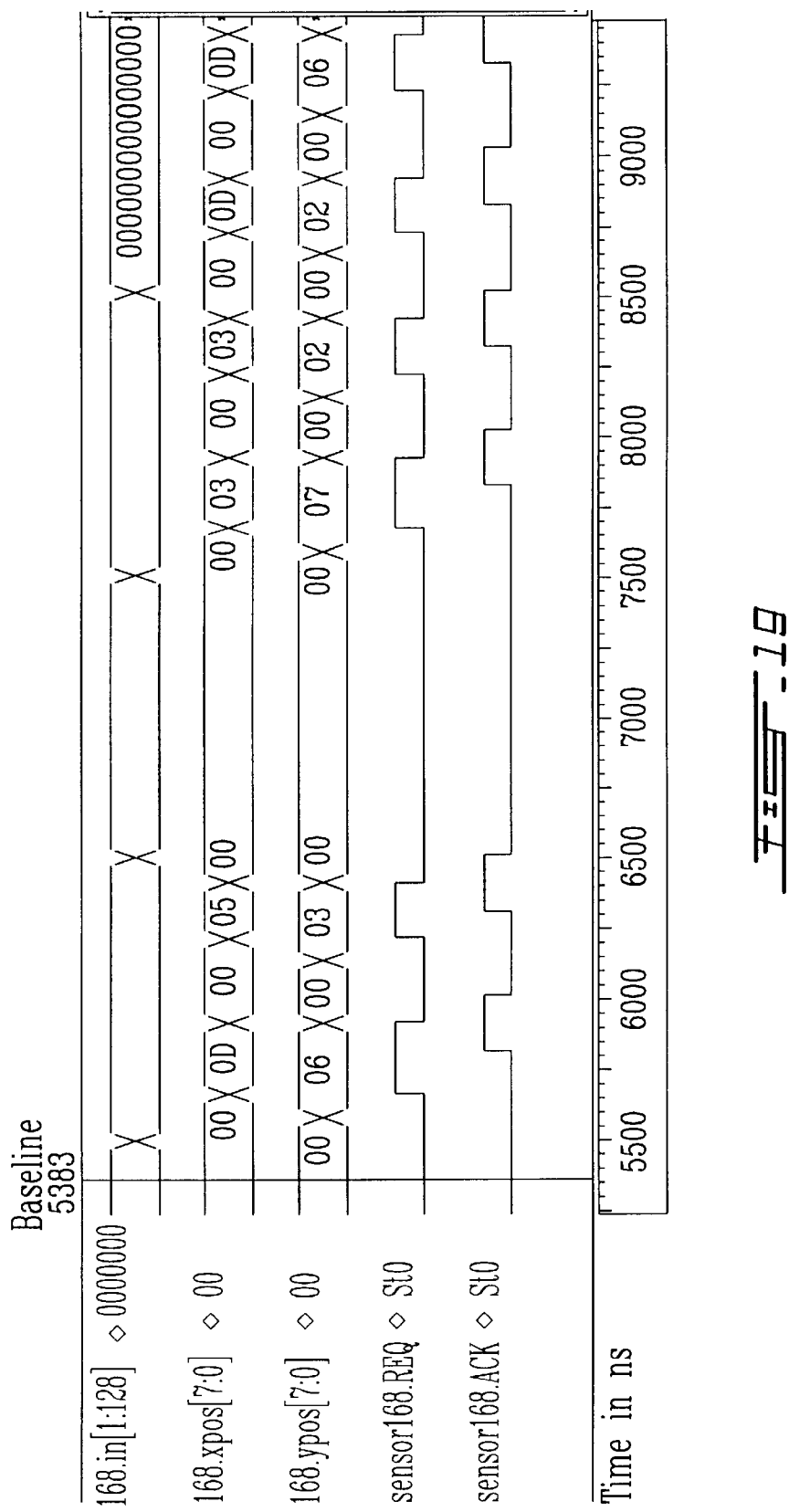
FIG. 19. Simulation of a 16×8 motion sensor. There are X and Y arbitration trees that encodes the pixels requests in the xpos and ypos buses.

Using Verilog HDL, a simulation of the communication cycle is presented in FIG. 19. The simulation corresponds to a 16×8 pixels array with X and Y arbitration trees. There are several pixels signaling at the same time, encoded in the test vector in[1:128]. The external REQ and ACK lines are used to read sequentially the pixels coordinates encoded in buses xpos[7:0] and ypos[7:0].

Figure 5A:
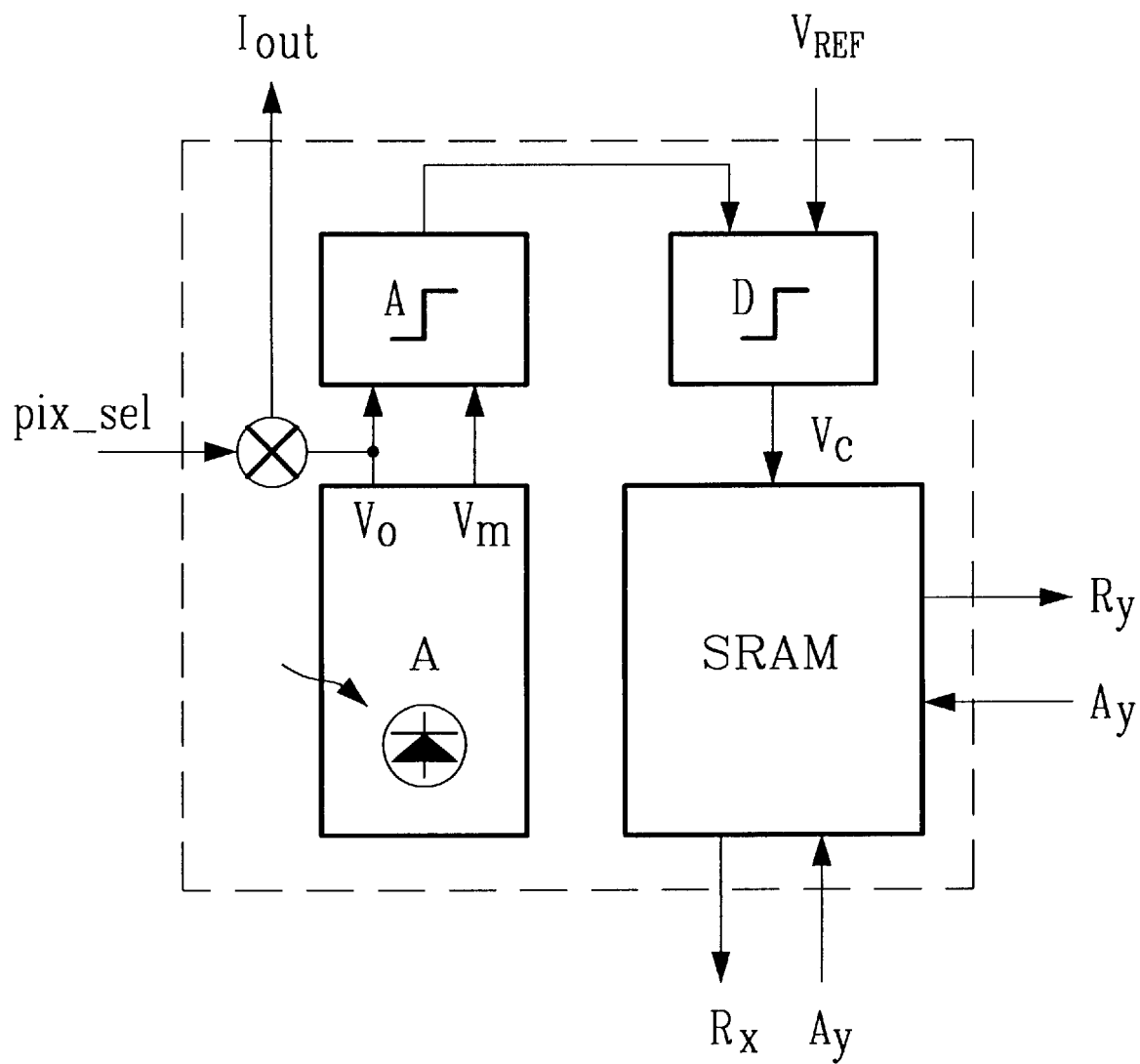
FIG. 5A is a variation of the motion based self-signaling pixel of FIG. 5.

To recapitulate the foregoing, FIGS. 5 and 5A are block diagrams of the motion sensor. The architecture consists of an array of self-signaling pixels with an event-address communication protocol to send off-chip the pixel coordinates.

The pixels detect illumination changes in the image using analog VLSI techniques. If motion is detected, the pixels initiate a signalization signal by sending requests through row and column lines to arbitration circuits.

The event-address system is implemented with two asynchronous arbiter tress 7 that decide on requests sequencing, avoiding collisions during multiple motion-based pixel signalization. Encoder circuits codify the signaling pixel position into two coordinate buses Arbiter circuits implement the off-chip communication by handshake signals REQ and ACK.

In addition, the architecture includes scanning circuitry to read out the illumination value from each pixel. The scanners select an individual pixel through row and column lines and route out a copy of the photoreceptor instantaneous response.

The pixels are composed of a time-adaptive photoreceptor 5, analog conditioning circuitry and a 1-bit digital memory cell (see FIG. 6). The photoreceptor uses adaptation to detect temporal illumination changes produced by moving edges in the image. The photoreceptor provides two outputs, an instantaneous illumination output and a time-adapted output that responds with rapid voltage transitions when temporal illumination changes are sensed.

The photoreceptor adaptive output is compared to its instantaneous response, then compared to an external threshold voltage (which sets the sensitivity to the edge spatiotemporal contrast) and finally converted to a digital level. The signal is then used to trigger the pixel memory cell which indicates the detection of motion. The memory cell is interfaced to row and column lines used to initiate a request signal. Once the request has been served, the surrounding arbitration circuitry resets the memory state by asserting row and column Acknowledge lines.

The arbiter trees are built around a basic cascadable 2:1 arbitration cell operating asynchronously (see FIG. 6). The arbiter module asserts only one acknowledge line if any of the input request lines (or both) are active. Request activity is passed at deeper levels by OR-ing both request signals $R_o$). The arbiter modules works only is a deeper level enables the module through the $A_o$ signal, that is, if the arbiter at a deeper level has decided on a request.

Two encoders send out the signaling pixel coordinates during a transfer cycle. The communication process is coordinated externally through a request (REQ) and an acknowledge (ACK) line.

The motion sensor works as follows: when a moving edge triggers one or more pixels in the array, the pixels initiate a communication cycle. Only one pixel is served at a time. The pixels requests are served first by the Y-arbitration tree (row). Once a row is acknowledged, the X-arbitration tree (column) decides on a column and asserts the external REQ line. When the interruption is detected by the external processor, the x-y buses are enabled, communicating the pixel coordinates off-chip. External circuitry reads the pixel coordinates and asserts the ACK line to finish the communication cycle. The pixel is reset, releasing the REQ line, and leaving the system ready for a new communication cycle.

The motion sensor operation is continuous in time. Communication is completely asynchronous, limited internally by the propagation delay of the arbitration and encoding circuitry, and externally by the speed of the coprocessing module to read out the pixel coordinates.

6. System

The sensor facilitates the detection of motion by self-signaling pixels that communicate their coordinates off-chip. Pixel positions are associated to an external RAM position where a time-stamp is stored. The time stamps are generated in a free running counter (digital timer) with a programmable time reference.

6.1. Digital Module

The role of the digital module 40 is to serve the motion sensor 49 requests by reading the signaling pixel coordinates, and writing the current time stamp to the external RAM memory 42. After a fixed measurement time period, the digital module reads out the time-stamps from RAM 42 and applies a one-pass algorithm 47 to compute velocity vectors that are stored on RAM and/or send-out to a host processor for higher level processing. Off-the-shelf microprocessor boards and microcontroller systems are perfectly suited for this task where memory mapped devices like the motion sensor and the RAM can be accessed directly. Microcontrollers also include timer circuitry, interface circuitry and interruption based functionality. Further integration can be achieved by designing a custom digital module with a microprocessor core and additional circuitry to speed up the velocity computation algorithm. Thus a compact 3 chip system can be put together, that could compute in real time image motion.

6.2. RAM Organization, Pixel Data Grouping

In order to simplify the velocity vectors computation, an special distribution of RAM memory is implemented. To compute a 1-D velocity vector, an edge has to travel along two neighbor pixels. In the 2-D case, the edge has to travel across four pixels in Cartesian coordinates, providing four time-stamps in the motion sensor. The sensor is divided in regular sets of four pixels as shown in FIG. 20. The pixel coordinates represents a unique RAM address where the time-stamp will be written. To facilitate data distribution, adjacent memory locations in RAM correspond to pixels in a set. Automatic distribution of addresses from the pixel coordinates is obtaining by wiring the coordinates bus as shown in FIG. 20, where the two LSB of the address corresponds to the LSB of the X and Y coordinate buses from the sensor.

Before measuring motion, the RAM has to be cleared by filling it with zeros. During motion measurement, several locations are written with time-stamps, and once the measurement period has finished, the digital module applies a one-pass algorithm that computes the velocity vector for each set of pixels. Thus, a m×n sensor will have a m/2×n/2 velocities vector field.

6.3. One-Pass Algorithm

The velocity computation algorithm calculates the velocity vector from the four time stamps of a set of four neighbor pixels. The organization of data in RAM memory speed up the computation because data is read-out from contiguous locations avoiding pixel position recalculation. The algorithm computes a resultant velocity vector by first computing the velocity vectors along the principal axis. Using the time differences, the velocity vectors along the X, Y, 45° and 135° can be computed directly. The sign of the time stamp difference can be used to locate the direction and quadrant where the resultant vector is located. Then, the resultant vector can be computed using the time stamp difference absolute value, reducing the computation to a 0°–90° range.

Good resolution in the time-stamp generator (timer) will provide enough precision to compute the resultant vector avoiding the problems encountered in a previous design that did not use the arbitration circuitry [4].

Figure 21:
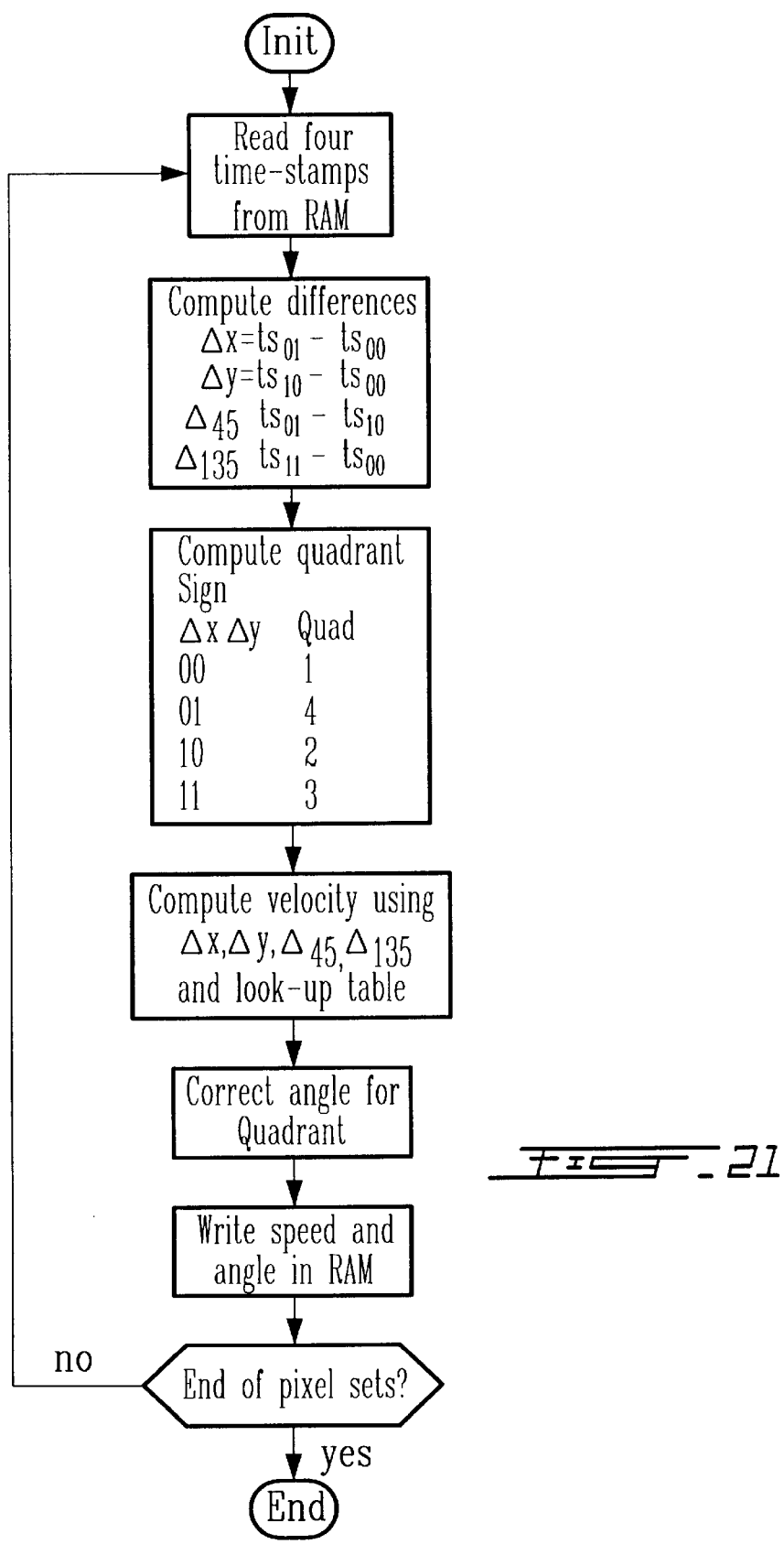
FIG. 21. Velocity computation algorithm. The digital module reads four memory locations which contains the time stamps corresponding to a 4-pixel set, and computes the velocity vector associated to the pixels. The velocity vector is send out to the host processor.

FIG. 21 resumes the velocity computation algorithm.

Velocity computation is carried on externally by a companion digital processor that serves the sensor requests (see FIG. 4A). The velocity computation module consists on a digital control module, a digital timer, RAM memory and a host interface. The control module serves the requests from the motion sensor and uses the timer values to generate the time stamps. For each motion request, the digital module assigns a temporal label (time-stamp) to a RAM location corresponding to the pixel coordinate. The time-stamps are used later to compute the time difference among neighbor pixels and obtain the velocity vector.

The velocity computation process is executed at a fixed rate. Motion events are captured during a predefined period of time (measurement period) that depends on the scale of motion to be measured. RAM memory is initially set to zero values, and then filled with the time stamps from the sensor-coprocessor communication process. At the end of the measurement period, the time-stamp list is scanned and a one-pass algorithm is applied to compute the velocity vectors. A velocity vector table is generated and sent to a host computer through the system interface.

The motion sensor is time-scale programmable. The time reference can be programmed to the range and resolution of the velocity computation required for a specific application.

The possibility of pixel self-signaling allows asynchronous communication at high transfer rates in the order of microseconds. On the other hand, the time constants of image feature motion are in the order of 10's of milliseconds, providing a wide time interval for multiple pixel data transfers. Bottleneck problems are not a concern, even for dense pixel arrays. The communication channel is optimally used since data is only transmitted when motion is detected.

In a motion pair monitored by a digital timer, minimum and maximum velocity values are limited by the maximum and minimum time-differences measured, respectively. The velocity range is given by:

$$V_{max} = \frac{\Delta x}{\Delta t_{min}}$$

$$V_{min} = \frac{\Delta x}{\Delta t_{max}}$$

wherein $\Delta t$ is the distance between adjacent photoreceptors, equal to 1 pixel for a 1-D array, $\Delta t_{max}$ and $\Delta t_{min}$ are the maximum and minimum measured time-of-travel or time difference.

Additionally, the measurement of $\Delta t$ is confined to a fixed measurement period that will be called frame thereafter for convenience, although the concept of frames as in digital sequences is not valid, because the edge detection and the velocity computation are contained in the continuous time between frames.

The minimum time measurement $\Delta t_{min}$, corresponds to the smallest time step ($T_{step}$) used in the time-base (digital timer), but it corresponds to an extremely large velocity not implemented in practical systems. Properly chosen, the minimum time step can be far from the noise limit imposed by the system physics. The maximum velocity that the motion pair can measure has to be limited to avoid spatial alias effects. Spatial alias occurs when an edge triggers more than one motion pair during the same measurement period, reporting false velocity vectors as a trace. A maximum velocity would correspond to a measure of several time steps from the digital time reference.

$\Delta t_{max}$ defines the minimum velocity measured. Given that the minimum velocity that a motion pair can measure is 1 pixel/frame, $\Delta t_{max}$ sets the maximum count allowed in the digital time reference during a frame.

The measurement period or frame is thus, divided in discrete time steps:

$$T_F = N_Q T_{step}$$

where $T_F$ is the measurement period corresponding to a frame, it could last any arbitrary period of time. $N_Q$ is the number of quantization steps to measure the minimum velocity of $V_{min}$–1 pixel/frame, $T_{step}$ is the duration of the quantization step programmed in the time base, that is, the time it takes the timer counter to increment one count.

In high density arrays where motion pairs are adjacent to each other, the maximum velocity allowed to avoid spatial alias effects is 3 pixels/frame.

In Cartesian topology (see FIG. 2), motion pairs can be formed by grouping the pixels along the X and Y axis (motion pairs 1–2, 3–4, 2–3 and 1–4). Additionally, pairs oriented to 45° (motion pairs formed by pixels 1–3 and 2–4) can be used to enhance the angular resolution. The 360° is divided into 8 angular regions covering 45°. Each motion pair covers an angular resolution of 45° distributed symmetrically around its own axe in a ±22.5° interval.

7. VLSI Implementation

Figure 22:
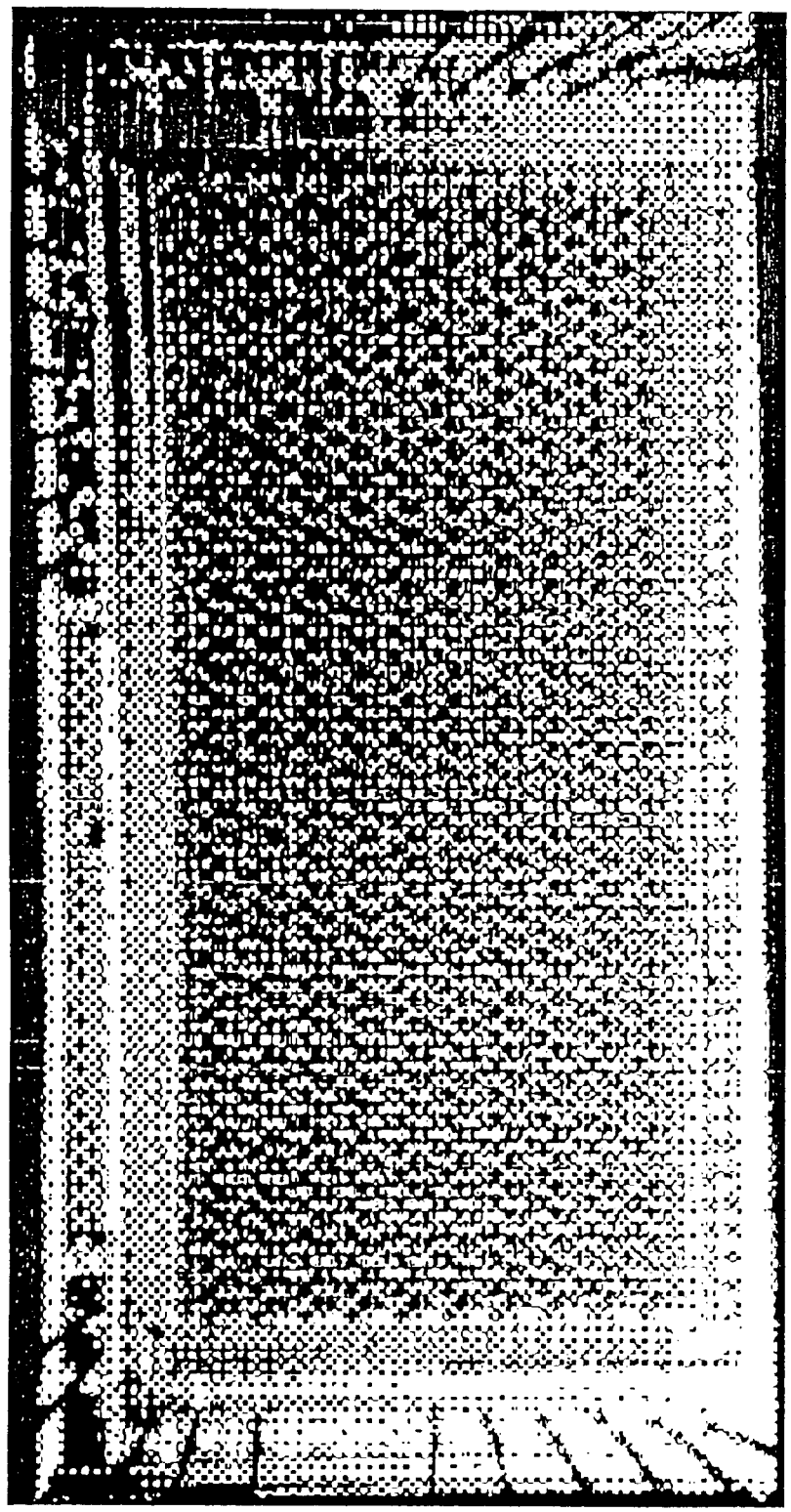
FIG. 22. Die photograph of a 50×22 motion sensor prototype.

A concept proof prototype was developed in a 1.5 microns CMOS technology. The prototype integrates a 50×22 pixels array in two fabrication tiles. FIG. 22 is a microphotograph of the fabricated motion sensor. Table 1 summarizes the principal characteristics of the prototype.

TABLE 1

MAIN CHARACTERISTICS OF THE MOTION SENSOR PROTOTYPE

| | |
|---|---|
| Fabrication technology | 1.5 microns, 2-metal, 2-poly, pwell CMOS |
| Chip size | 6.2 × 3.1 mm |
| Pixel size | 210 microns2 |
| Capacitor area in the pixel | 250 microns2 |
| Transistors per pixel | 33, including read-out transistors |
| Pixel intensity output | Continuous time operation Logarithmic I/V conversion |
| Input/Output data format | |
| Motion | Pixel address buses X[0:5], Y[0:5] Request and Acknowledge lines Input bias voltages to set operation points |
| Scanners | X and Y scanners independent controls for dir, clk and datain ovlx, ovly, overflow outputs Iout current output |
| Others | Imean, illumination mean output |
| Package | 68-pin PGA |
| PowerSupply | 5 V |

The pixel employs only 33 transistors including read-out transistors and the global mean-illumination computation circuitry. Motion events are communicated through an output three-state bus, microprocessor compatible. The circuit may be interfaced directly to a microprocessor bus and served during interrupt requests.

Additionally, intensity images can be read-out by a conventional scanning mechanism which samples each pixel in the array. The intensity output is a multiplexed current copy of the instantaneous pixel response to illumination. An illumination-mean output is also provided in order to estimate the scene illumination level, as a guide to external control circuitry such as electronic iris, and to the dynamic control of the quantization range of an external A/D converter.

8. Results

A 50×22 pixels version of the motion vision sensor is currently installed in a custom camera. The camera is controlled by a high performance microcontroller which scans the sensor, serves motion-produced interrupt requests and communicates velocity vector fields and intensity images to a host computer through a standard serial link. Preliminary experiments show good performance.

FIG. 23 illustrates some results from high level simulations with real images. The architecture does not deal with the aperture problem, but the velocity field provided by the sensor can be easily processed by higher levels of the system.

9. Conclusions

A focal plane motion sensor architecture was developed. The sensor detects moving edges and communicates its position in real-time. An address event protocol, combined with a time-stamp scheme, labels each motion event for later velocity computation. Separating velocity computation from motion sensing simplify the sensor pixel design without sacrificing performance, and benefiting the system with an optimal pixel size for large array applications. A high resolution sensor (128×128 pixels, 8×6 mm in a 0.8 microns CMOS technology) is in fabrication. The architecture can be integrated effectively to other focal plane architectures for smart imagers or complex vision machines.

I claim:

1. An system for detecting and determining the direction of motion of an object, an image of which appears as an image formed by an array of pixels, said system comprising:
    a motion sensor with self-signaling pixels for signaling detection of motion and transmitting information regarding that motion;
    a digital module which receives the information regarding the detected motion, which module stores said information and after a fixed measurement time period computes velocity vectors from said information received from a set of at least two pixels and then transmits said velocity vectors to a host computer for further use; and
    wherein said motion sensor and digital module combination allows for real time continuous operation of the system.

2. The system of claim 1 wherein the motion sensor has an array with a plurality of self-signaling pixels.

3. The system of claim 2 wherein the set of pixels comprises four pixels so that the digital module can compute a bidimensional velocity vector.

4. The system of claim 3 wherein a plurality of velocity vectors are sent as a vector map to the host computer.

5. The system of claim 1 wherein the motion sensor further comprises at least one arbiter for request sequentiation of signals from the pixels to avoid collisions during multiple motion based signalization by said pixels.

6. The system of claim 1 wherein the fixed measurement time period can be changed to allow for a range of resolution of velocity computation.

7. The system of claim 1 wherein the pixel circuitry is designed for slow adaptation to gradual changes in illumination and to quick response to sharp changes in illumination so that the pixels detect moving edges.

8. A method for detecting motion of an object and determining the direction and speed of that motion, said method comprising the steps of:
    sensing motion with a plurality of self-signaling pixels, which pixels make up an array of a motion sensor;
    signaling by each of the pixels as they detect motion that they have detected motion;
    sequencing for attention during a time measurement period information being provided by each of the pixels which are sensing motion;
    time stamping the information received from each of the pixels;
    saving the information from each pixel which has been time stamped to a specific memory address;
    retrieving from memory at the end of each time measurement period the information from each pixel which has been time stamped during that measurement period;
    computing velocity vectors from the time stamped information;
    creating with the computed velocity vectors a velocity vector map; and
    using the velocity vector map to determine direction of motion and speed of an object.

9. The method of claim 8 wherein the step of computing the velocity vector further comprises the steps of:
    reading from specific memory addresses time stamped information of four adjacent pixels;
    computing a direction of a velocity vector with the time stamped information from the four pixels;
    computing a speed of the velocity vector with the time stamped information from the four pixels; and
    saving the velocity vector to a velocity vector map.

10. A self-signaling pixel for use in a motion sensing array for detecting motion comprising:
    a photoreceptor for detecting motion;
    analog conditioning circuitry to convert a photoreceptor signal from an analog to a digital signal;
    a digital memory cell to store signals generated by the photoreceptor; and
    wherein the pixel is operatively connected to the motion sensing array such that when the photodetector detects motion the photodetector generates an analog signal with information concerning the motion, which signal is in turn converted to a digital signal which is saved to the memory cell which cell retains the information until a signal sent by the pixel to the motion sensing array is acknowledged whereupon the information in the cell is transferred from the memory cell to the sensing array for further processing and the memory cell is reset to receive and save the next signal generated by the photodetector.

* * * * *